US009172987B2

(12) United States Patent
Lemmons et al.

(10) Patent No.: US 9,172,987 B2
(45) Date of Patent: *Oct. 27, 2015

(54) METHODS AND SYSTEMS FOR UPDATING FUNCTIONALITY OF A SET-TOP BOX USING MARKUP LANGUAGE

(75) Inventors: Thomas R. Lemmons, Sand Springs, OK (US); Jon C. Zaring, Tulsa, OK (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/193,233

(22) Filed: Jul. 28, 2011

(65) Prior Publication Data

US 2012/0054800 A1 Mar. 1, 2012

Related U.S. Application Data

(63) Continuation of application No. 11/432,686, filed on May 10, 2006, now Pat. No. 8,010,979, which is a continuation of application No. 10/171,424, filed on Jun. 12, 2002, now Pat. No. 7,073,188, which is a (Continued)

(51) Int. Cl.
*H04N 21/4147* (2011.01)
*H04N 21/462* (2011.01)
(Continued)

(52) U.S. Cl.
CPC ....... *H04N 21/4147* (2013.01); *H04N 5/44543* (2013.01); *H04N 21/4355* (2013.01); *H04N 21/4622* (2013.01); *H04N 21/482* (2013.01); *H04N 21/4821* (2013.01);

(Continued)

(58) Field of Classification Search
CPC ........... H04N 21/40–21/4888; H04N 21/8543; H04N 5/44543
USPC ...................... 725/39–61, 136–153; 715/760; 348/460, 461
See application file for complete search history.

(56) References Cited

U.S. PATENT DOCUMENTS 3,278,677 A   10/1966   Fannoy
3,440,427 A    4/1969   Kammer
(Continued)

FOREIGN PATENT DOCUMENTS

AU    731010    7/1998
AU    733993    2/1999
(Continued)

OTHER PUBLICATIONS

"A Financial Times Survey: Viewdata (Advertisement)." Financial Times, Mar. 20, 1979.
(Continued)

*Primary Examiner* — Larry Sternbane
(74) *Attorney, Agent, or Firm* — Ropes & Gray LLP

(57) ABSTRACT

An interactive television program guide is provided. Program guide display elements are arranged and styled using markup language documents. These markup language documents may also indicate and select program guide functions. The program guide interprets the markup language documents and generates the display screens and program guide functionality without user intervention. The program guide may also be updated by supplying new markup language documents that modify display screens and program guide functionality. The markup language documents may be supplied by a main facility or a television distribution facility.

16 Claims, 12 Drawing Sheets

Related U.S. Application Data continuation of application No. 09/227,358, filed on Jan. 8, 1999, now Pat. No. 6,442,755.

(60) Provisional application No. 60/091,975, filed on Jul. 7, 1998.

(51) Int. Cl.

| | |
|---|---|
| *H04N 5/445* | (2011.01) |
| *H04N 21/482* | (2011.01) |
| *H04N 21/84* | (2011.01) |
| *H04N 21/8543* | (2011.01) |
| *H04N 21/435* | (2011.01) |

(52) U.S. Cl.
CPC .......... *H04N 21/84* (2013.01); *H04N 21/8543* (2013.01); *H04N 2005/44565* (2013.01)

(56) References Cited

U.S. PATENT DOCUMENTS

| | | |
|---|---|---|
| 3,492,577 A | 1/1970 | Reiter et al. |
| 3,493,674 A | 2/1970 | Houghton |
| 3,729,581 A | 4/1973 | Anderson |
| 3,833,757 A | 9/1974 | Kirk, Jr. et al. |
| 3,848,193 A | 11/1974 | Martin et al. |
| 3,891,792 A | 6/1975 | Kimura |
| 3,936,868 A | 2/1976 | Thorpe |
| 3,987,398 A | 10/1976 | Fung |
| 3,996,583 A | 12/1976 | Hutt et al. |
| 4,004,085 A | 1/1977 | Makino et al. |
| 4,016,361 A | 4/1977 | Pandey |
| 4,024,401 A | 5/1977 | Bernstein et al. |
| 4,026,555 A | 5/1977 | Kirschner et al. |
| 4,031,548 A | 6/1977 | Kato et al. |
| 4,052,719 A | 10/1977 | Hutt et al. |
| 4,058,830 A | 11/1977 | Guinet et al. |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |
| 4,156,850 A | 5/1979 | Beyers, Jr. |
| 4,161,728 A | 7/1979 | Insam |
| 4,162,513 A | 7/1979 | Beyers, Jr. et al. |
| 4,170,782 A | 10/1979 | Miller |
| 4,186,413 A | 1/1980 | Mortimer |
| 4,203,130 A | 5/1980 | Doumit et al. |
| 4,205,343 A | 5/1980 | Barrett |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,249,213 A | 2/1981 | Imaide et al. |
| 4,261,006 A | 4/1981 | Weintraub et al. |
| 4,264,924 A | 4/1981 | Freeman |
| 4,264,925 A | 4/1981 | Freeman et al. |
| 4,270,145 A | 5/1981 | Farina |
| 4,271,532 A | 6/1981 | Wine |
| 4,276,597 A | 6/1981 | Dissly et al. |
| 4,280,148 A | 7/1981 | Saxena |
| 4,283,787 A | 8/1981 | Chambers |
| 4,287,593 A | 9/1981 | Stover |
| 4,288,809 A | 9/1981 | Yabe |
| 4,290,142 A | 9/1981 | Schnee et al. |
| 4,305,101 A | 12/1981 | Yarbrough et al. |
| 4,307,446 A | 12/1981 | Barton et al. |
| 4,329,684 A | 5/1982 | Monteath et al. |
| 4,331,974 A | 5/1982 | Cogswell et al. |
| 4,337,480 A | 6/1982 | Bourassin et al. |
| 4,337,483 A | 6/1982 | Guillou |
| 4,344,090 A | 8/1982 | Belisomi et al. |
| 4,347,498 A | 8/1982 | Lee et al. |
| 4,367,559 A | 1/1983 | Tults |
| 4,375,651 A | 3/1983 | Templin et al. |
| 4,381,522 A | 4/1983 | Lambert |
| 4,388,645 A | 6/1983 | Cox et al. |
| 4,390,901 A | 6/1983 | Keiser et al. |
| 4,393,376 A | 7/1983 | Thomas |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,579 A | 1/1984 | Merrell |
| 4,425,581 A | 1/1984 | Schweppe et al. |
| 4,429,385 A | 1/1984 | Cichelli et al. |
| 4,439,784 A | 3/1984 | Furukawa et al. |
| 4,449,249 A | 5/1984 | Price |
| 4,456,925 A | 6/1984 | Skerlos et al. |
| 4,466,017 A | 8/1984 | Banker |
| 4,477,830 A | 10/1984 | Lindman et al. |
| 4,488,179 A | 12/1984 | Kruger et al. |
| 4,495,654 A | 1/1985 | Deiss |
| 4,496,171 A | 1/1985 | Cherry |
| 4,496,976 A | 1/1985 | Swanson et al. |
| 4,510,623 A | 4/1985 | Bonneau et al. |
| 4,521,806 A | 6/1985 | Abraham |
| 4,523,228 A | 6/1985 | Banker |
| 4,527,194 A | 7/1985 | Sirazi |
| 4,531,020 A | 7/1985 | Wechselberger et al. |
| 4,533,910 A | 8/1985 | Sukonick et al. |
| 4,536,791 A | 8/1985 | Campbell et al. |
| 4,547,804 A | 10/1985 | Greenberg |
| 4,554,584 A | 11/1985 | Elam et al. |
| 4,555,775 A | 11/1985 | Pike |
| 4,566,034 A | 1/1986 | Harger et al. |
| 4,567,512 A | 1/1986 | Abraham |
| 4,573,072 A | 2/1986 | Freeman |
| 4,587,514 A | 5/1986 | Schas et al. |
| 4,587,520 A | 5/1986 | Astle |
| 4,590,516 A | 5/1986 | Abraham |
| 4,595,951 A | 6/1986 | Filliman |
| 4,595,952 A | 6/1986 | Filliman |
| 4,598,288 A | 7/1986 | Yarbrough et al. |
| 4,602,279 A | 7/1986 | Freeman |
| 4,605,964 A | 8/1986 | Chard |
| 4,605,973 A | 8/1986 | Von Kohorn |
| 4,620,229 A | 10/1986 | Amano et al. |
| 4,622,545 A | 11/1986 | Atkinson |
| 4,623,920 A | 11/1986 | Dufresne et al. |
| 4,635,109 A | 1/1987 | Comeau |
| 4,635,121 A | 1/1987 | Hoffman |
| 4,641,205 A | 2/1987 | Beyers, Jr. |
| 4,677,466 A | 6/1987 | Lert, Jr. et al. |
| 4,685,131 A | 8/1987 | Horne |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,704,725 A | 11/1987 | Harvey et al. |
| 4,706,121 A | 11/1987 | Young |
| 4,710,971 A | 12/1987 | Nozaki et al. |
| 4,712,105 A | 12/1987 | Kohler |
| 4,718,107 A | 1/1988 | Hayes |
| RE32,632 E | 3/1988 | Atkinson |
| 4,742,543 A | 5/1988 | Frederiksen |
| 4,745,549 A | 5/1988 | Hashimoto |
| 4,748,618 A | 5/1988 | Brown et al. |
| 4,750,036 A | 6/1988 | Martinez |
| 4,750,213 A | 6/1988 | Novak |
| 4,751,578 A | 6/1988 | Reiter et al. |
| 4,754,326 A | 6/1988 | Kram et al. |
| 4,768,228 A | 8/1988 | Clupper et al. |
| 4,772,882 A | 9/1988 | Mical |
| 4,775,935 A | 10/1988 | Yourick |
| 4,785,408 A | 11/1988 | Britton et al. |
| 4,787,063 A | 11/1988 | Muguet et al. |
| 4,787,085 A | 11/1988 | Suto et al. |
| 4,812,834 A | 3/1989 | Wells |
| 4,814,883 A | 3/1989 | Perine et al. |
| 4,821,102 A | 4/1989 | Ichikawa et al. |

(56) References Cited

U.S. PATENT DOCUMENTS

| | | |
|---|---|---|
| 4,821,211 A | 4/1989 | Torres |
| 4,829,372 A | 5/1989 | McCalley et al. |
| 4,829,558 A | 5/1989 | Welsh |
| 4,829,569 A | 5/1989 | Seth-Smith et al. |
| 4,847,604 A | 7/1989 | Doyle |
| 4,847,700 A | 7/1989 | Freeman |
| 4,857,799 A | 8/1989 | Spindt et al. |
| 4,857,999 A | 8/1989 | Welsh |
| 4,862,268 A | 8/1989 | Campbell et al. |
| 4,864,429 A | 9/1989 | Eigeldinger et al. |
| 4,866,770 A | 9/1989 | Seth-Smith et al. |
| 4,868,866 A | 9/1989 | Williams, Jr. |
| 4,873,623 A | 10/1989 | Lane et al. |
| 4,882,732 A | 11/1989 | Kaminaga et al. |
| 4,884,223 A | 11/1989 | Ingle et al. |
| 4,888,796 A | 12/1989 | Olivo, Jr. |
| 4,890,320 A | 12/1989 | Monslow et al. |
| 4,890,321 A | 12/1989 | Seth-Smith et al. |
| 4,894,789 A | 1/1990 | Yee |
| 4,899,136 A | 2/1990 | Beard et al. |
| 4,905,094 A | 2/1990 | Pocock et al. |
| 4,908,707 A | 3/1990 | Kinghorn |
| 4,908,713 A | 3/1990 | Levine |
| 4,908,859 A | 3/1990 | Bennett et al. |
| 4,914,517 A | 4/1990 | Duffield |
| 4,914,732 A | 4/1990 | Henderson et al. |
| 4,930,158 A | 5/1990 | Vogel |
| 4,930,160 A | 5/1990 | Vogel |
| 4,931,783 A | 6/1990 | Atkinson |
| 4,935,865 A | 6/1990 | Rowe et al. |
| 4,937,821 A | 6/1990 | Boulton |
| 4,937,863 A | 6/1990 | Robert et al. |
| 4,939,507 A | 7/1990 | Beard et al. |
| 4,943,963 A | 7/1990 | Waechter et al. |
| 4,959,719 A | 9/1990 | Strubbe et al. |
| 4,959,720 A | 9/1990 | Duffield et al. |
| 4,963,994 A | 10/1990 | Levine |
| 4,977,455 A | 12/1990 | Young |
| 4,982,430 A | 1/1991 | Frezza et al. |
| 4,987,486 A | 1/1991 | Johnson et al. |
| 4,991,011 A | 2/1991 | Johnson et al. |
| 4,991,012 A | 2/1991 | Yoshino |
| 4,992,940 A | 2/1991 | Dworkin |
| 4,994,908 A | 2/1991 | Kuban et al. |
| 4,994,909 A | 2/1991 | Graves et al. |
| 4,995,078 A | 2/1991 | Monslow et al. |
| 4,996,642 A | 2/1991 | Hey |
| 4,998,171 A | 3/1991 | Kim et al. |
| 5,001,554 A | 3/1991 | Johnson et al. |
| 5,003,591 A | 3/1991 | Kauffman et al. |
| 5,008,853 A | 4/1991 | Bly et al. |
| 5,014,125 A | 5/1991 | Pocock et al. |
| 5,027,400 A | 6/1991 | Baji et al. |
| 5,036,314 A | 7/1991 | Barillari et al. |
| 5,038,211 A | 8/1991 | Hallenbeck |
| 5,045,947 A | 9/1991 | Beery |
| 5,047,867 A | 9/1991 | Strubbe et al. |
| 5,053,883 A | 10/1991 | Johnson |
| 5,058,160 A | 10/1991 | Banker et al. |
| 5,062,060 A | 10/1991 | Kolnick |
| 5,068,734 A | 11/1991 | Beery |
| 5,072,412 A | 12/1991 | Henderson, Jr. et al. |
| 5,075,771 A | 12/1991 | Hashimoto |
| 5,077,607 A | 12/1991 | Johnson et al. |
| 5,083,800 A | 1/1992 | Lockton |
| 5,090,049 A | 2/1992 | Chen |
| 5,091,785 A | 2/1992 | Canfield et al. |
| 5,091,936 A | 2/1992 | Katznelson et al. |
| 5,093,921 A | 3/1992 | Bevins, Jr. |
| 5,099,319 A | 3/1992 | Esch et al. |
| 5,103,314 A | 4/1992 | Keenan |
| 5,105,184 A | 4/1992 | Pirani et al. |
| 5,119,188 A | 6/1992 | McCalley et al. |
| 5,121,476 A | 6/1992 | Yee |
| 5,123,046 A | 6/1992 | Levine |
| 5,126,851 A | 6/1992 | Yoshimura et al. |
| 5,132,992 A | 7/1992 | Yurt et al. |
| 5,133,079 A | 7/1992 | Ballantyne et al. |
| 5,148,154 A | 9/1992 | Mackay et al. |
| 5,151,782 A | 9/1992 | Ferraro |
| 5,151,789 A | 9/1992 | Young |
| 5,155,591 A | 10/1992 | Wachob |
| 5,155,806 A | 10/1992 | Hoeber et al. |
| 5,157,768 A | 10/1992 | Hoeber et al. |
| 5,161,023 A | 11/1992 | Keenan |
| 5,162,905 A | 11/1992 | Itoh et al. |
| 5,170,388 A | 12/1992 | Endoh et al. |
| 5,172,111 A | 12/1992 | Olivo, Jr. |
| 5,177,604 A | 1/1993 | Martinez |
| 5,179,439 A | 1/1993 | Hashimoto |
| 5,179,654 A | 1/1993 | Richards et al. |
| 5,182,640 A | 1/1993 | Takano |
| 5,189,630 A | 2/1993 | Barstow et al. |
| 5,191,423 A | 3/1993 | Yoshida |
| 5,195,092 A | 3/1993 | Wilson et al. |
| 5,195,134 A | 3/1993 | Inoue et al. |
| 5,200,823 A | 4/1993 | Yoneda et al. |
| 5,204,897 A | 4/1993 | Wyman |
| 5,206,722 A | 4/1993 | Kwan |
| 5,210,611 A | 5/1993 | Yee et al. |
| 5,212,553 A | 5/1993 | Maruoka |
| 5,214,622 A | 5/1993 | Nemoto et al. |
| 5,216,515 A | 6/1993 | Steele et al. |
| 5,220,420 A | 6/1993 | Hoarty et al. |
| 5,223,924 A | 6/1993 | Strubbe |
| 5,227,874 A | 7/1993 | Von Kohorn |
| 5,231,493 A | 7/1993 | Apitz |
| 5,231,494 A | 7/1993 | Wachob |
| RE34,340 E | 8/1993 | Freeman |
| 5,233,423 A | 8/1993 | Jernigan et al. |
| 5,233,654 A | 8/1993 | Harvey et al. |
| 5,235,415 A | 8/1993 | Bonicel et al. |
| 5,236,199 A | 8/1993 | Thompson, Jr. |
| 5,237,411 A | 8/1993 | Fink et al. |
| 5,237,417 A | 8/1993 | Hayashi et al. |
| 5,237,418 A | 8/1993 | Kaneko |
| 5,239,540 A | 8/1993 | Rovira et al. |
| 5,245,420 A | 9/1993 | Harney et al. |
| 5,247,347 A | 9/1993 | Litteral et al. |
| 5,247,364 A | 9/1993 | Banker et al. |
| 5,247,580 A | 9/1993 | Kimura et al. |
| 5,253,066 A | 10/1993 | Vogel |
| 5,253,067 A | 10/1993 | Chaney et al. |
| 5,260,778 A | 11/1993 | Kauffman et al. |
| 5,260,788 A | 11/1993 | Takano et al. |
| 5,260,999 A | 11/1993 | Wyman |
| 5,262,860 A | 11/1993 | Fitzpatrick et al. |
| 5,283,639 A | 2/1994 | Esch et al. |
| 5,283,819 A | 2/1994 | Glick et al. |
| 5,285,272 A | 2/1994 | Bradley et al. |
| 5,293,357 A | 3/1994 | Hallenbeck |
| 5,301,028 A | 4/1994 | Banker et al. |
| 5,307,173 A | 4/1994 | Yuen et al. |
| 5,311,423 A | 5/1994 | Clark |
| 5,313,282 A | 5/1994 | Hayashi |
| 5,317,403 A | 5/1994 | Keenan |
| 5,319,445 A | 6/1994 | Fitts |
| 5,319,707 A | 6/1994 | Wasilewski et al. |
| 5,323,234 A | 6/1994 | Kawasaki |
| 5,323,240 A | 6/1994 | Amano et al. |
| 5,325,183 A | 6/1994 | Rhee |
| 5,325,423 A | 6/1994 | Lewis |
| 5,335,277 A | 8/1994 | Harvey et al. |
| 5,337,155 A | 8/1994 | Cornelis |
| 5,343,239 A | 8/1994 | Lappington et al. |
| 5,343,300 A | 8/1994 | Hennig |
| 5,345,594 A | 9/1994 | Tsuda |
| 5,347,167 A | 9/1994 | Singh |
| 5,347,632 A | 9/1994 | Filepp et al. |
| 5,351,075 A | 9/1994 | Herz et al. |
| 5,353,121 A | 10/1994 | Young et al. |
| 5,355,480 A | 10/1994 | Smith et al. |
| 5,357,276 A | 10/1994 | Banker et al. |
| 5,359,367 A | 10/1994 | Stockill et al. |

(56) References Cited

U.S. PATENT DOCUMENTS

| | | |
|---|---|---|
| 5,359,601 A | 10/1994 | Wasilewski et al. |
| 5,365,282 A | 11/1994 | Levine |
| 5,367,316 A | 11/1994 | Ikezaki |
| 5,367,330 A | 11/1994 | Haave et al. |
| 5,367,571 A | 11/1994 | Bowen et al. |
| 5,373,288 A | 12/1994 | Blahut |
| 5,374,951 A | 12/1994 | Welsh |
| 5,377,317 A | 12/1994 | Bates et al. |
| 5,377,319 A | 12/1994 | Kitahara et al. |
| 5,382,983 A | 1/1995 | Kwoh et al. |
| 5,384,910 A | 1/1995 | Torres |
| 5,387,945 A | 2/1995 | Takeuchi |
| 5,396,546 A | 3/1995 | Remillard |
| 5,398,074 A | 3/1995 | Duffield et al. |
| 5,404,393 A | 4/1995 | Remillard |
| 5,410,326 A | 4/1995 | Goldstein |
| 5,410,343 A | 4/1995 | Coddington et al. |
| 5,410,344 A | 4/1995 | Graves et al. |
| 5,410,367 A | 4/1995 | Zahavi et al. |
| 5,412,720 A | 5/1995 | Hoarty |
| 5,414,756 A | 5/1995 | Levine |
| 5,416,508 A | 5/1995 | Sakuma et al. |
| 5,424,770 A | 6/1995 | Schmelzer et al. |
| 5,425,101 A | 6/1995 | Woo et al. |
| 5,432,561 A | 7/1995 | Strubbe |
| 5,434,626 A | 7/1995 | Hayashi et al. |
| 5,436,676 A | 7/1995 | Pint et al. |
| 5,440,623 A | 8/1995 | Moore et al. |
| 5,440,632 A | 8/1995 | Bacon et al. |
| 5,444,499 A | 8/1995 | Saitoh et al. |
| 5,446,919 A | 8/1995 | Wilkins |
| 5,452,012 A | 9/1995 | Saitoh |
| 5,459,522 A | 10/1995 | Pint |
| 5,461,415 A | 10/1995 | Wolf et al. |
| 5,465,113 A | 11/1995 | Gilboy |
| 5,465,385 A | 11/1995 | Ohga et al. |
| 5,469,206 A | 11/1995 | Strubbe et al. |
| 5,477,262 A | 12/1995 | Banker et al. |
| 5,479,266 A | 12/1995 | Young et al. |
| 5,479,268 A | 12/1995 | Young et al. |
| 5,479,497 A | 12/1995 | Kovarik |
| 5,481,296 A | 1/1996 | Cragun et al. |
| 5,483,278 A | 1/1996 | Strubbe et al. |
| 5,485,197 A | 1/1996 | Hoarty |
| 5,485,219 A | 1/1996 | Woo |
| 5,485,221 A | 1/1996 | Banker et al. |
| 5,488,409 A | 1/1996 | Yuen et al. |
| 5,489,103 A | 2/1996 | Okamoto et al. |
| 5,495,295 A | 2/1996 | Long |
| 5,502,504 A | 3/1996 | Marshall et al. |
| 5,515,098 A | 5/1996 | Carles |
| 5,515,106 A | 5/1996 | Chaney et al. |
| 5,515,511 A | 5/1996 | Nguyen et al. |
| 5,517,254 A | 5/1996 | Monta et al. |
| 5,523,794 A | 6/1996 | Mankovitz et al. |
| 5,523,796 A | 6/1996 | Marshall et al. |
| 5,524,195 A | 6/1996 | Clanton, III et al. |
| 5,526,034 A | 6/1996 | Hoarty et al. |
| 5,528,304 A | 6/1996 | Cherrick et al. |
| 5,532,735 A | 7/1996 | Blahut et al. |
| 5,532,754 A | 7/1996 | Young et al. |
| 5,534,911 A | 7/1996 | Levitan |
| 5,537,141 A | 7/1996 | Harper et al. |
| 5,539,822 A | 7/1996 | Lett |
| 5,541,662 A | 7/1996 | Adams et al. |
| 5,541,738 A | 7/1996 | Mankovitz |
| 5,550,576 A | 8/1996 | Klosterman |
| 5,552,833 A | 9/1996 | Henmi et al. |
| 5,553,221 A | 9/1996 | Reimer et al. |
| 5,557,338 A | 9/1996 | Maze et al. |
| 5,557,721 A | 9/1996 | Fite et al. |
| 5,559,548 A | 9/1996 | Davis et al. |
| 5,559,549 A | 9/1996 | Hendricks et al. |
| 5,559,550 A | 9/1996 | Mankovitz |
| 5,559,942 A | 9/1996 | Gough et al. |
| 5,561,471 A | 10/1996 | Kim et al. |
| 5,561,709 A | 10/1996 | Remillard |
| 5,563,648 A | 10/1996 | Menand et al. |
| 5,563,665 A | 10/1996 | Chang |
| 5,570,295 A | 10/1996 | Isenberg et al. |
| 5,572,442 A | 11/1996 | Schulhof et al. |
| 5,574,962 A | 11/1996 | Fardeau et al. |
| 5,576,755 A | 11/1996 | Davis et al. |
| 5,576,765 A | 11/1996 | Cheney et al. |
| 5,579,055 A | 11/1996 | Hamilton et al. |
| 5,581,479 A | 12/1996 | McLaughlin et al. |
| 5,582,364 A | 12/1996 | Trulin et al. |
| 5,583,560 A | 12/1996 | Florin et al. |
| 5,583,563 A | 12/1996 | Wanderscheid et al. |
| 5,583,937 A | 12/1996 | Ullrich et al. |
| 5,585,838 A | 12/1996 | Lawler |
| 5,585,865 A | 12/1996 | Amano et al. |
| 5,585,866 A | 12/1996 | Miller et al. |
| 5,589,892 A | 12/1996 | Knee et al. |
| 5,592,551 A | 1/1997 | Lett et al. |
| 5,594,490 A | 1/1997 | Dawson et al. |
| 5,594,509 A | 1/1997 | Florin et al. |
| 5,594,661 A | 1/1997 | Bruner et al. |
| 5,596,373 A | 1/1997 | White et al. |
| 5,600,364 A | 2/1997 | Hendricks et al. |
| 5,600,366 A | 2/1997 | Schulman |
| 5,600,573 A | 2/1997 | Hendricks et al. |
| 5,602,582 A | 2/1997 | Wanderscheid et al. |
| 5,602,596 A | 2/1997 | Claussen et al. |
| 5,602,597 A | 2/1997 | Bertram |
| 5,606,374 A | 2/1997 | Bertram |
| 5,610,653 A | 3/1997 | Abecassis |
| 5,617,565 A | 4/1997 | Augenbraun et al. |
| 5,619,247 A | 4/1997 | Russo |
| 5,619,249 A | 4/1997 | Billock et al. |
| 5,619,274 A | 4/1997 | Roop et al. |
| 5,621,456 A | 4/1997 | Florin et al. |
| 5,623,613 A | 4/1997 | Rowe et al. |
| 5,627,940 A | 5/1997 | Rohra et al. |
| 5,627,960 A | 5/1997 | Clifford et al. |
| 5,629,733 A | 5/1997 | Youman et al. |
| 5,630,119 A | 5/1997 | Aristides et al. |
| 5,631,995 A | 5/1997 | Weissensteiner et al. |
| 5,633,683 A | 5/1997 | Rosengren et al. |
| 5,635,978 A | 6/1997 | Alten et al. |
| 5,635,979 A | 6/1997 | Kostreski et al. |
| 5,635,989 A | 6/1997 | Rothmuller |
| 5,636,346 A | 6/1997 | Saxe |
| 5,640,501 A | 6/1997 | Turpin |
| 5,640,577 A | 6/1997 | Scharmer |
| 5,642,153 A | 6/1997 | Chaney et al. |
| 5,648,813 A | 7/1997 | Tanigawa et al. |
| 5,648,824 A | 7/1997 | Dunn et al. |
| 5,650,826 A | 7/1997 | Eitz |
| 5,650,831 A | 7/1997 | Farwell |
| 5,652,613 A | 7/1997 | Lazarus et al. |
| 5,652,615 A | 7/1997 | Bryant et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,657,091 A | 8/1997 | Bertram |
| 5,659,350 A | 8/1997 | Hendricks et al. |
| 5,659,366 A | 8/1997 | Kerman |
| 5,661,516 A | 8/1997 | Carles |
| 5,661,517 A | 8/1997 | Budow et al. |
| 5,663,757 A | 9/1997 | Morales |
| 5,664,111 A | 9/1997 | Nahan et al. |
| 5,666,293 A | 9/1997 | Metz et al. |
| 5,666,498 A | 9/1997 | Amro |
| 5,666,645 A | 9/1997 | Thomas et al. |
| 5,668,591 A | 9/1997 | Shintani |
| 5,671,276 A | 9/1997 | Eyer et al. |
| 5,671,411 A | 9/1997 | Watts et al. |
| 5,675,390 A | 10/1997 | Schindler et al. |
| 5,675,752 A | 10/1997 | Scott et al. |
| 5,677,708 A | 10/1997 | Matthews, III et al. |
| 5,677,981 A | 10/1997 | Kato et al. |
| 5,682,195 A | 10/1997 | Hendricks et al. |
| 5,682,206 A | 10/1997 | Wehmeyer et al. |

(56) References Cited

U.S. PATENT DOCUMENTS

| | | |
|---|---|---|
| 5,684,525 A | 11/1997 | Klosterman |
| 5,686,954 A | 11/1997 | Yoshinobu et al. |
| 5,687,331 A | 11/1997 | Volk et al. |
| 5,689,648 A | 11/1997 | Diaz et al. |
| 5,689,666 A | 11/1997 | Berquist et al. |
| 5,692,214 A | 11/1997 | Levine |
| 5,694,163 A | 12/1997 | Harrison |
| 5,694,176 A | 12/1997 | Bruette et al. |
| 5,694,381 A | 12/1997 | Sako |
| 5,696,905 A | 12/1997 | Reimer et al. |
| 5,699,107 A | 12/1997 | Lawler et al. |
| 5,699,125 A | 12/1997 | Rzeszewski et al. |
| 5,708,478 A | 1/1998 | Tognazzini |
| 5,710,601 A | 1/1998 | Marshall et al. |
| 5,710,815 A | 1/1998 | Ming et al. |
| 5,710,884 A | 1/1998 | Dedrick |
| 5,715,314 A | 2/1998 | Payne et al. |
| 5,715,399 A | 2/1998 | Bezos |
| 5,715,515 A | 2/1998 | Akins, III et al. |
| 5,717,452 A | 2/1998 | Janin et al. |
| 5,717,923 A | 2/1998 | Dedrick |
| 5,721,829 A | 2/1998 | Dunn et al. |
| 5,722,041 A | 2/1998 | Freadman |
| 5,724,103 A | 3/1998 | Batchelor |
| 5,724,521 A | 3/1998 | Dedrick |
| 5,724,525 A | 3/1998 | Beyers, II et al. |
| 5,724,567 A | 3/1998 | Rose et al. |
| 5,727,060 A | 3/1998 | Young |
| 5,727,163 A | 3/1998 | Bezos |
| 5,731,844 A | 3/1998 | Rauch et al. |
| 5,734,444 A | 3/1998 | Yoshinobu |
| 5,734,853 A | 3/1998 | Hendricks et al. |
| 5,734,893 A | 3/1998 | Li et al. |
| 5,737,028 A | 4/1998 | Bertram et al. |
| 5,737,030 A | 4/1998 | Hong et al. |
| 5,740,549 A | 4/1998 | Reilly et al. |
| 5,751,282 A | 5/1998 | Girard et al. |
| 5,752,080 A | 5/1998 | Ryan |
| 5,752,159 A | 5/1998 | Faust et al. |
| 5,752,160 A | 5/1998 | Dunn |
| 5,754,258 A | 5/1998 | Hanaya et al. |
| 5,754,771 A | 5/1998 | Epperson et al. |
| 5,754,939 A | 5/1998 | Herz et al. |
| 5,757,417 A | 5/1998 | Aras et al. |
| 5,758,257 A | 5/1998 | Herz et al. |
| 5,758,259 A | 5/1998 | Lawler |
| 5,760,821 A | 6/1998 | Ellis et al. |
| 5,761,372 A | 6/1998 | Yoshinobu et al. |
| 5,761,601 A | 6/1998 | Nemirofsky et al. |
| 5,761,606 A | 6/1998 | Wolzien |
| 5,768,528 A | 6/1998 | Stumm |
| 5,768,539 A | 6/1998 | Metz et al. |
| 5,774,170 A | 6/1998 | Hite et al. |
| 5,774,357 A | 6/1998 | Hoffberg et al. |
| 5,774,534 A | 6/1998 | Mayer |
| 5,774,664 A | 6/1998 | Hidary et al. |
| 5,774,887 A | 6/1998 | Wolff et al. |
| 5,778,181 A | 7/1998 | Hidary et al. |
| 5,778,182 A | 7/1998 | Cathey et al. |
| 5,778,372 A | 7/1998 | Cordell et al. |
| 5,781,226 A | 7/1998 | Sheehan |
| 5,781,245 A | 7/1998 | Van Der Weij et al. |
| 5,781,246 A | 7/1998 | Alten et al. |
| 5,784,258 A | 7/1998 | Quinn |
| 5,790,201 A | 8/1998 | Antos |
| 5,790,202 A | 8/1998 | Kummer et al. |
| 5,790,426 A | 8/1998 | Robinson |
| 5,790,753 A | 8/1998 | Krishnamoorthy et al. |
| 5,793,438 A | 8/1998 | Bedard |
| 5,793,964 A | 8/1998 | Rogers et al. |
| 5,793,972 A | 8/1998 | Shane et al. |
| 5,798,785 A | 8/1998 | Hendricks et al. |
| 5,801,747 A | 9/1998 | Bedard |
| 5,801,785 A | 9/1998 | Crump et al. |
| 5,801,787 A | 9/1998 | Schein et al. |
| 5,802,284 A | 9/1998 | Karlton et al. |
| 5,805,154 A | 9/1998 | Brown |
| 5,805,167 A | 9/1998 | van Cruyningen |
| 5,805,235 A | 9/1998 | Bedard |
| 5,805,763 A | 9/1998 | Lawler et al. |
| 5,805,804 A | 9/1998 | Laursen et al. |
| 5,805,806 A | 9/1998 | McArthur |
| 5,808,608 A | 9/1998 | Young et al. |
| 5,808,694 A | 9/1998 | Usui et al. |
| 5,809,204 A | 9/1998 | Young et al. |
| 5,809,214 A | 9/1998 | Nureki et al. |
| 5,812,205 A | 9/1998 | Milnes et al. |
| 5,815,145 A | 9/1998 | Matthews, III |
| 5,815,671 A | 9/1998 | Morrison |
| 5,818,438 A | 10/1998 | Howe et al. |
| 5,818,439 A | 10/1998 | Nagasaka et al. |
| 5,818,441 A | 10/1998 | Throckmorton et al. |
| 5,818,511 A | 10/1998 | Farry et al. |
| 5,818,541 A | 10/1998 | Matsuura et al. |
| 5,818,935 A | 10/1998 | Maa |
| 5,819,019 A | 10/1998 | Nelson |
| 5,819,156 A | 10/1998 | Belmont |
| 5,819,284 A | 10/1998 | Farber et al. |
| 5,819,285 A | 10/1998 | Damico et al. |
| 5,822,123 A | 10/1998 | Davis et al. |
| 5,828,402 A | 10/1998 | Collings |
| 5,828,420 A | 10/1998 | Marshall et al. |
| 5,828,839 A | 10/1998 | Moncreiff |
| 5,828,945 A | 10/1998 | Klosterman |
| 5,830,068 A | 11/1998 | Brenner et al. |
| 5,832,223 A | 11/1998 | Hara et al. |
| 5,833,468 A | 11/1998 | Guy et al. |
| 5,835,717 A | 11/1998 | Karlton et al. |
| 5,838,314 A | 11/1998 | Neel et al. |
| 5,838,383 A | 11/1998 | Chimoto et al. |
| 5,842,010 A | 11/1998 | Jain et al. |
| 5,842,199 A | 11/1998 | Miller et al. |
| 5,844,552 A | 12/1998 | Gaughan et al. |
| 5,844,620 A | 12/1998 | Coleman et al. |
| 5,848,352 A | 12/1998 | Dougherty et al. |
| 5,848,396 A | 12/1998 | Gerace |
| 5,848,397 A | 12/1998 | Marsh et al. |
| 5,850,218 A * | 12/1998 | LaJoie et al. .............. 725/45 |
| 5,852,437 A | 12/1998 | Wugofski et al. |
| 5,861,881 A | 1/1999 | Freeman et al. |
| 5,861,906 A | 1/1999 | Dunn et al. |
| 5,862,292 A | 1/1999 | Kubota et al. |
| 5,867,226 A | 2/1999 | Wehmeyer et al. |
| 5,867,227 A | 2/1999 | Yamaguchi |
| 5,872,588 A | 2/1999 | Aras et al. |
| 5,873,660 A | 2/1999 | Walsh et al. |
| 5,874,985 A | 2/1999 | Matthews, III |
| 5,875,108 A | 2/1999 | Hoffberg et al. |
| 5,877,906 A | 3/1999 | Nagasawa et al. |
| 5,880,768 A | 3/1999 | Lemmons et al. |
| 5,883,677 A | 3/1999 | Hofmann |
| 5,886,691 A | 3/1999 | Furuya et al. |
| 5,886,731 A | 3/1999 | Ebisawa |
| 5,889,950 A | 3/1999 | Kuzma |
| 5,892,498 A | 4/1999 | Marshall et al. |
| 5,892,535 A | 4/1999 | Allen et al. |
| 5,892,767 A | 4/1999 | Bell et al. |
| 5,900,905 A | 5/1999 | Shoff et al. |
| 5,903,314 A | 5/1999 | Niijima et al. |
| 5,903,545 A | 5/1999 | Sabourin et al. |
| 5,903,816 A | 5/1999 | Broadwin et al. |
| 5,905,497 A | 5/1999 | Vaughan et al. |
| 5,907,322 A | 5/1999 | Kelly et al. |
| 5,907,323 A | 5/1999 | Lawler et al. |
| 5,907,366 A | 5/1999 | Farmer et al. |
| 5,914,712 A | 6/1999 | Sartain et al. |
| 5,914,746 A | 6/1999 | Matthews, III et al. |
| 5,917,481 A | 6/1999 | Rzeszewski et al. |
| 5,917,830 A | 6/1999 | Chen et al. |
| 5,918,010 A | 6/1999 | Appleman et al. |
| 5,918,014 A | 6/1999 | Robinson |
| 5,920,700 A | 7/1999 | Gordon et al. |
| 5,923,848 A | 7/1999 | Goodhand et al. |
| 5,929,849 A | 7/1999 | Kikinis |

(56) References Cited

U.S. PATENT DOCUMENTS

| | | |
|---|---|---|
| 5,929,850 A | 7/1999 | Broadwin et al. |
| 5,929,932 A | 7/1999 | Otsuki et al. |
| 5,931,905 A | 8/1999 | Hashimoto et al. |
| 5,936,679 A | 8/1999 | Kasahara et al. |
| 5,937,160 A | 8/1999 | Davis et al. |
| 5,940,073 A | 8/1999 | Klosterman et al. |
| 5,940,572 A | 8/1999 | Balaban et al. |
| 5,945,988 A | 8/1999 | Williams et al. |
| 5,946,386 A | 8/1999 | Rogers et al. |
| 5,949,954 A | 9/1999 | Young et al. |
| 5,951,642 A | 9/1999 | Onoe et al. |
| 5,955,988 A | 9/1999 | Blonstein et al. |
| 5,956,505 A | 9/1999 | Manduley |
| 5,959,688 A | 9/1999 | Schein et al. |
| 5,960,411 A | 9/1999 | Hartman et al. |
| 5,969,748 A | 10/1999 | Casement et al. |
| 5,973,683 A | 10/1999 | Cragun et al. |
| 5,974,222 A | 10/1999 | Yuen et al. |
| 5,977,964 A | 11/1999 | Williams et al. |
| 5,982,445 A * | 11/1999 | Eyer et al. ............ 348/461 |
| 5,983,236 A | 11/1999 | Yager et al. |
| 5,986,650 A | 11/1999 | Ellis et al. |
| 5,988,078 A | 11/1999 | Levine |
| 5,990,890 A | 11/1999 | Etheredge |
| 5,990,927 A | 11/1999 | Hendricks et al. |
| 5,991,799 A | 11/1999 | Yen et al. |
| 5,999,912 A | 12/1999 | Wodarz et al. |
| 6,002,393 A | 12/1999 | Hite et al. |
| 6,002,394 A | 12/1999 | Schein et al. |
| 6,005,562 A | 12/1999 | Shiga et al. |
| 6,005,563 A | 12/1999 | White et al. |
| 6,005,565 A | 12/1999 | Legall et al. |
| 6,005,597 A | 12/1999 | Barrett et al. |
| 6,006,257 A | 12/1999 | Slezak |
| 6,008,802 A | 12/1999 | Iki et al. |
| 6,008,803 A | 12/1999 | Rowe et al. |
| 6,011,546 A | 1/2000 | Bertram |
| 6,014,137 A | 1/2000 | Burns |
| 6,014,184 A | 1/2000 | Knee et al. |
| 6,014,502 A | 1/2000 | Moraes |
| 6,016,141 A | 1/2000 | Knudsen et al. |
| 6,018,372 A | 1/2000 | Etheredge |
| 6,018,768 A | 1/2000 | Ullman et al. |
| 6,020,880 A | 2/2000 | Naimpally |
| 6,020,883 A | 2/2000 | Herz et al. |
| 6,020,929 A | 2/2000 | Marshall et al. |
| 6,023,267 A | 2/2000 | Chapuis et al. |
| 6,025,837 A | 2/2000 | Matthews, III et al. |
| 6,025,886 A | 2/2000 | Koda |
| 6,028,599 A | 2/2000 | Yuen et al. |
| 6,029,045 A | 2/2000 | Picco et al. |
| 6,029,195 A | 2/2000 | Herz |
| 6,035,304 A | 3/2000 | Machida et al. |
| 6,047,317 A | 4/2000 | Bisdikian et al. |
| 6,049,824 A | 4/2000 | Simonin |
| 6,049,831 A | 4/2000 | Gardell et al. |
| 6,052,145 A | 4/2000 | Macrae et al. |
| 6,061,060 A | 5/2000 | Berry et al. |
| 6,061,097 A | 5/2000 | Satterfield |
| 6,064,376 A | 5/2000 | Berezowski et al. |
| 6,064,980 A | 5/2000 | Jacobi et al. |
| 6,067,303 A | 5/2000 | Aaker et al. |
| 6,067,561 A | 5/2000 | Dillon |
| 6,072,460 A | 6/2000 | Marshall et al. |
| 6,075,526 A | 6/2000 | Rothmuller |
| 6,075,551 A | 6/2000 | Berezowski et al. |
| 6,075,575 A | 6/2000 | Schein et al. |
| 6,078,348 A | 6/2000 | Klosterman et al. |
| 6,081,263 A | 6/2000 | Legall et al. |
| 6,081,750 A | 6/2000 | Hoffberg et al. |
| 6,088,717 A * | 7/2000 | Reed et al. ............ 709/201 |
| 6,088,722 A | 7/2000 | Herz et al. |
| 6,091,883 A | 7/2000 | Artigalas et al. |
| 6,098,065 A | 8/2000 | Skillen et al. |
| 6,101,488 A * | 8/2000 | Hayashi et al. ............ 706/45 |
| 6,104,705 A | 8/2000 | Ismail et al. |
| 6,108,042 A | 8/2000 | Adams et al. |
| 6,111,614 A | 8/2000 | Mugura et al. |
| 6,112,186 A | 8/2000 | Bergh et al. |
| 6,115,057 A | 9/2000 | Kwoh et al. |
| 6,118,492 A | 9/2000 | Milnes et al. |
| 6,119,098 A | 9/2000 | Guyot et al. |
| 6,119,101 A | 9/2000 | Peckover |
| 6,122,011 A | 9/2000 | Dias et al. |
| 6,125,230 A | 9/2000 | Yaginumav et al. |
| 6,125,259 A * | 9/2000 | Perlman ............ 725/28 |
| 6,133,909 A | 10/2000 | Schein et al. |
| 6,139,177 A | 10/2000 | Venkatraman et al. |
| 6,141,003 A | 10/2000 | Chor et al. |
| 6,147,714 A | 11/2000 | Terasawa et al. |
| 6,151,059 A | 11/2000 | Schein et al. |
| 6,151,643 A | 11/2000 | Cheng et al. |
| 6,154,203 A | 11/2000 | Yuen et al. |
| 6,157,411 A | 12/2000 | Williams et al. |
| 6,157,413 A | 12/2000 | Hanafee et al. |
| 6,160,545 A | 12/2000 | Eyer et al. |
| 6,160,546 A | 12/2000 | Thompson et al. |
| 6,160,570 A | 12/2000 | Sitnik |
| 6,163,316 A | 12/2000 | Killian |
| 6,163,345 A | 12/2000 | Noguchi et al. |
| 6,166,728 A | 12/2000 | Haman et al. |
| 6,169,542 B1 | 1/2001 | Hooks et al. |
| 6,172,674 B1 | 1/2001 | Etheredge |
| 6,172,677 B1 | 1/2001 | Stautner et al. |
| 6,173,271 B1 | 1/2001 | Goodman et al. |
| 6,173,316 B1 * | 1/2001 | De Boor et al. ............ 709/218 |
| 6,177,931 B1 | 1/2001 | Alexander et al. |
| 6,178,446 B1 | 1/2001 | Gerszberg et al. |
| 6,181,335 B1 | 1/2001 | Hendricks et al. |
| 6,184,877 B1 | 2/2001 | Dodson et al. |
| 6,186,443 B1 | 2/2001 | Shaffer |
| 6,191,780 B1 | 2/2001 | Martin et al. |
| 6,202,212 B1 | 3/2001 | Sturgeon et al. |
| 6,208,335 B1 | 3/2001 | Gordon et al. |
| 6,209,129 B1 | 3/2001 | Carr et al. |
| 6,209,130 B1 | 3/2001 | Rector, Jr. et al. |
| 6,212,553 B1 | 4/2001 | Lee et al. |
| 6,216,264 B1 | 4/2001 | Maze et al. |
| 6,222,530 B1 | 4/2001 | Sequeira |
| 6,226,442 B1 | 5/2001 | Park |
| 6,226,642 B1 * | 5/2001 | Beranek et al. ............ 348/211.13 |
| 6,226,793 B1 | 5/2001 | Kwoh |
| 6,239,794 B1 | 5/2001 | Yuen et al. |
| 6,240,555 B1 | 5/2001 | Shoff et al. |
| 6,253,203 B1 | 6/2001 | O'Flaherty et al. |
| 6,256,071 B1 | 7/2001 | Hiroi |
| 6,256,785 B1 | 7/2001 | Klappert et al. |
| 6,257,268 B1 | 7/2001 | Hope et al. |
| 6,262,721 B1 | 7/2001 | Tsukidate et al. |
| 6,262,722 B1 | 7/2001 | Allison et al. |
| 6,263,501 B1 | 7/2001 | Schein et al. |
| 6,263,507 B1 | 7/2001 | Ahmad et al. |
| 6,266,681 B1 * | 7/2001 | Guthrie ............ 715/234 |
| 6,268,849 B1 | 7/2001 | Boyer et al. |
| 6,275,268 B1 | 8/2001 | Ellis et al. |
| 6,279,157 B1 | 8/2001 | Takasu |
| 6,285,713 B1 | 9/2001 | Nakaya et al. |
| 6,286,140 B1 | 9/2001 | Ivanyi |
| 6,288,716 B1 | 9/2001 | Humpleman et al. |
| 6,289,346 B1 | 9/2001 | Milewski et al. |
| 6,298,482 B1 | 10/2001 | Seidman et al. |
| 6,301,538 B1 | 10/2001 | Kirchhoffer et al. |
| 6,304,651 B1 * | 10/2001 | Cramer et al. ............ 379/221.01 |
| 6,310,886 B1 | 10/2001 | Barton et al. |
| 6,311,329 B1 | 10/2001 | Terakado et al. |
| 6,311,877 B1 | 11/2001 | Yang et al. |
| 6,312,336 B1 | 11/2001 | Handelman et al. |
| 6,317,885 B1 | 11/2001 | Fries |
| 6,320,588 B1 | 11/2001 | Palmer et al. |
| 6,323,911 B1 | 11/2001 | Schein et al. |
| 6,331,877 B1 | 12/2001 | Bennington et al. |
| 6,335,963 B1 | 1/2002 | Bosco |
| 6,341,195 B1 | 1/2002 | Mankovitz et al. |
| 6,341,374 B2 | 1/2002 | Scheintal |

(56) References Cited

U.S. PATENT DOCUMENTS

| | | | |
|---|---|---|---|
| 6,342,926 B1 | 1/2002 | Hanafee et al. | |
| 6,357,042 B2 | 3/2002 | Srinivasan et al. | |
| 6,357,043 B1 | 3/2002 | Ellis et al. | |
| 6,359,636 B1 | 3/2002 | Schindler et al. | |
| 6,363,525 B1 | 3/2002 | Dougherty et al. | |
| 6,373,528 B1 | 4/2002 | Bennington et al. | |
| 6,381,582 B1 | 4/2002 | Walker et al. | |
| 6,388,714 B1 | 5/2002 | Schein et al. | |
| 6,389,593 B1 | 5/2002 | Yamagishi | |
| 6,392,710 B1 | 5/2002 | Gonsalves et al. | |
| 6,396,546 B1 | 5/2002 | Alten et al. | |
| 6,400,407 B1 | 6/2002 | Zigmond et al. | |
| 6,405,371 B1 | 6/2002 | Oosterhout et al. | |
| 6,408,437 B1 | 6/2002 | Hendricks et al. | |
| 6,411,308 B1 | 6/2002 | Blonstein et al. | |
| 6,411,696 B1 | 6/2002 | Iverson et al. | |
| 6,412,110 B1 | 6/2002 | Schein et al. | |
| 6,418,556 B1 | 7/2002 | Bennington et al. | |
| 6,421,067 B1 | 7/2002 | Kamen et al. | |
| 6,430,175 B1 * | 8/2002 | Echols et al. | 370/352 |
| 6,437,836 B1 | 8/2002 | Huang et al. | |
| 6,446,261 B1 | 9/2002 | Rosser | |
| 6,453,471 B1 | 9/2002 | Klosterman | |
| 6,463,585 B1 | 10/2002 | Hendricks et al. | |
| 6,469,753 B1 | 10/2002 | Klosterman et al. | |
| 6,470,497 B1 | 10/2002 | Ellis et al. | |
| 6,477,579 B1 | 11/2002 | Kunkel et al. | |
| 6,477,705 B1 | 11/2002 | Yuen et al. | |
| 6,486,920 B2 | 11/2002 | Arai et al. | |
| 6,496,203 B1 * | 12/2002 | Beaumont et al. | 715/762 |
| 6,498,895 B2 | 12/2002 | Young et al. | |
| 6,505,348 B1 | 1/2003 | Knowles et al. | |
| 6,515,680 B1 | 2/2003 | Hendricks et al. | |
| 6,539,548 B1 | 3/2003 | Hendricks et al. | |
| 6,545,722 B1 | 4/2003 | Schultheiss et al. | |
| 6,546,556 B1 | 4/2003 | Kataoka et al. | |
| 6,564,378 B1 | 5/2003 | Satterfield et al. | |
| 6,564,379 B1 | 5/2003 | Knudson et al. | |
| 6,574,424 B1 | 6/2003 | Dimitri et al. | |
| 6,588,013 B1 | 7/2003 | Lumley et al. | |
| 6,600,364 B1 | 7/2003 | Liang et al. | |
| 6,600,503 B2 | 7/2003 | Stautner et al. | |
| 6,606,128 B2 | 8/2003 | Hanafee et al. | |
| 6,622,306 B1 | 9/2003 | Kamada | |
| 6,631,523 B1 | 10/2003 | Matthews, III et al. | |
| 6,651,251 B1 | 11/2003 | Shoff et al. | |
| 6,660,503 B2 | 12/2003 | Kierulff | |
| 6,661,468 B2 | 12/2003 | Alten et al. | |
| 6,665,869 B1 | 12/2003 | Ellis et al. | |
| 6,687,906 B1 | 2/2004 | Yuen et al. | |
| 6,698,020 B1 | 2/2004 | Zigmond et al. | |
| 6,732,369 B1 | 5/2004 | Schein et al. | |
| 6,738,978 B1 | 5/2004 | Hendricks et al. | |
| 6,742,183 B1 | 5/2004 | Reynolds et al. | |
| 6,751,800 B1 | 6/2004 | Fukuda et al. | |
| 6,754,904 B1 | 6/2004 | Cooper et al. | |
| 6,756,997 B1 | 6/2004 | Ward, III et al. | |
| 6,757,906 B1 | 6/2004 | Look et al. | |
| 6,799,326 B2 | 9/2004 | Boylan, III et al. | |
| 6,799,327 B1 | 9/2004 | Reynolds et al. | |
| 6,828,993 B1 | 12/2004 | Hendricks et al. | |
| 6,865,746 B1 | 3/2005 | Herrington et al. | |
| 6,868,551 B1 | 3/2005 | Lawler et al. | |
| 6,898,762 B2 | 5/2005 | Ellis et al. | |
| 6,928,652 B1 | 8/2005 | Goldman | |
| 6,938,208 B2 | 8/2005 | Reichardt | |
| 6,973,669 B2 | 12/2005 | Daniels | |
| 6,983,478 B1 | 1/2006 | Grauch et al. | |
| 7,003,792 B1 | 2/2006 | Yuen | |
| 7,028,326 B1 | 4/2006 | Westlake et al. | |
| 7,058,635 B1 | 6/2006 | Shah-Nazaroff et al. | |
| 7,069,576 B1 | 6/2006 | Knudson et al. | |
| 7,165,098 B1 | 1/2007 | Boyer et al. | |
| 7,185,355 B1 | 2/2007 | Ellis et al. | |
| 7,187,847 B2 | 3/2007 | Young et al. | |
| 7,266,833 B2 | 9/2007 | Ward, III et al. | |
| 7,293,276 B2 | 11/2007 | Phillips et al. | |
| 7,328,450 B2 | 2/2008 | Macrae et al. | |
| 7,392,532 B2 | 6/2008 | White et al. | |
| 7,480,929 B2 | 1/2009 | Klosterman et al. | |
| 7,571,457 B1 | 8/2009 | Hendricks et al. | |
| 7,665,109 B2 | 2/2010 | Matthews et al. | |
| 8,010,979 B2 * | 8/2011 | Lemmons et al. | 725/47 |
| 8,112,776 B2 | 2/2012 | Schein et al. | |
| 2001/0001160 A1 | 5/2001 | Shoff et al. | |
| 2001/0029610 A1 | 10/2001 | Corvin et al. | |
| 2001/0042246 A1 | 11/2001 | Yuen et al. | |
| 2001/0047298 A1 | 11/2001 | Moore et al. | |
| 2001/0049820 A1 | 12/2001 | Barton | |
| 2001/0054181 A1 | 12/2001 | Corvin | |
| 2002/0042913 A1 | 4/2002 | Ellis et al. | |
| 2002/0042914 A1 | 4/2002 | Walker et al. | |
| 2002/0042918 A1 | 4/2002 | Townsend et al. | |
| 2002/0049973 A1 | 4/2002 | Alten et al. | |
| 2002/0059599 A1 | 5/2002 | Schein et al. | |
| 2002/0059602 A1 | 5/2002 | Macrae et al. | |
| 2002/0073424 A1 | 6/2002 | Ward, III et al. | |
| 2002/0083439 A1 | 6/2002 | Eldering | |
| 2002/0092017 A1 | 7/2002 | Klosterman et al. | |
| 2002/0112249 A1 | 8/2002 | Hendricks et al. | |
| 2002/0120933 A1 | 8/2002 | Knudson et al. | |
| 2002/0124249 A1 | 9/2002 | Shintani et al. | |
| 2002/0138840 A1 | 9/2002 | Schein et al. | |
| 2003/0005432 A1 | 1/2003 | Ellis et al. | |
| 2003/0005445 A1 | 1/2003 | Schein et al. | |
| 2003/0110499 A1 | 6/2003 | Knudson et al. | |
| 2003/0115602 A1 | 6/2003 | Knee et al. | |
| 2003/0163813 A1 | 8/2003 | Klosterman et al. | |
| 2003/0164858 A1 | 9/2003 | Klosterman et al. | |
| 2003/0188310 A1 | 10/2003 | Klosterman et al. | |
| 2003/0188311 A1 | 10/2003 | Yuen et al. | |
| 2003/0196201 A1 | 10/2003 | Schein et al. | |
| 2003/0196203 A1 | 10/2003 | Ellis et al. | |
| 2003/0204847 A1 | 10/2003 | Ellis et al. | |
| 2003/0208756 A1 | 11/2003 | Macrae et al. | |
| 2003/0208758 A1 | 11/2003 | Schein et al. | |
| 2004/0003407 A1 | 1/2004 | Hanafee et al. | |
| 2004/0049787 A1 | 3/2004 | Maissel et al. | |
| 2004/0078809 A1 | 4/2004 | Drazin | |
| 2004/0078815 A1 | 4/2004 | Lemmons et al. | |
| 2004/0111742 A1 | 6/2004 | Hendricks et al. | |
| 2004/0139465 A1 | 7/2004 | Matthews et al. | |
| 2004/0168189 A1 | 8/2004 | Reynolds et al. | |
| 2004/0194131 A1 | 9/2004 | Ellis et al. | |
| 2004/0194138 A1 | 9/2004 | Boylan, III et al. | |
| 2004/0210935 A1 | 10/2004 | Schein et al. | |
| 2004/0221310 A1 | 11/2004 | Herrington et al. | |
| 2005/0015815 A1 | 1/2005 | Shoff et al. | |
| 2005/0097622 A1 | 5/2005 | Zigmond et al. | |
| 2005/0138660 A1 | 6/2005 | Boyer et al. | |
| 2005/0155056 A1 | 7/2005 | Knee et al. | |
| 2005/0157217 A1 | 7/2005 | Hendricks | |
| 2005/0198668 A1 | 9/2005 | Yuen et al. | |
| 2005/0204382 A1 | 9/2005 | Ellis | |
| 2005/0204388 A1 | 9/2005 | Knudson et al. | |
| 2005/0216936 A1 | 9/2005 | Knudson et al. | |
| 2005/0229214 A1 | 10/2005 | Young et al. | |
| 2005/0229215 A1 | 10/2005 | Schein et al. | |
| 2005/0235320 A1 | 10/2005 | Maze et al. | |
| 2005/0244138 A1 | 11/2005 | O'Connor et al. | |
| 2005/0278741 A1 | 12/2005 | Robarts et al. | |
| 2005/0283796 A1 | 12/2005 | Flickinger | |
| 2006/0037044 A1 | 2/2006 | Daniels | |
| 2006/0248555 A1 | 11/2006 | Eldering | |
| 2007/0271582 A1 | 11/2007 | Ellis et al. | |
| 2008/0005130 A1 * | 1/2008 | Logan et al. | 707/10 |
| 2008/0178221 A1 | 7/2008 | Schein et al. | |
| 2008/0184308 A1 | 7/2008 | Herrington et al. | |
| 2008/0184312 A1 | 7/2008 | Schein et al. | |
| 2008/0184315 A1 | 7/2008 | Ellis et al. | |
| 2008/0235725 A1 | 9/2008 | Hendricks | |

(56) References Cited

U.S. PATENT DOCUMENTS

| | | | |
|---|---|---|---|
| 2008/0288980 | A1 | 11/2008 | Schein et al. |
| 2009/0070817 | A1 | 3/2009 | Ellis et al. |

FOREIGN PATENT DOCUMENTS

| | | |
|---|---|---|
| CA | 1030505 | 5/1978 |
| CA | 1187197 | 5/1985 |
| CA | 1188811 | 6/1985 |
| CA | 1196082 | 10/1985 |
| CA | 1200911 | 2/1986 |
| CA | 2151458 | 6/1994 |
| CA | 2164608 | 12/1994 |
| CA | 2312326 | 6/1999 |
| CN | 1567986 | 1/2005 |
| DE | 2918846 | 11/1980 |
| DE | 3246225 | 6/1984 |
| DE | 3337204 | 4/1985 |
| DE | 3621263 | 1/1988 |
| DE | 3640436 | 6/1988 |
| DE | 3909334 | 9/1990 |
| DE | 4201031 | 7/1993 |
| DE | 4217246 | 12/1993 |
| DE | 4240187 | 6/1994 |
| DE | 4407701 | 9/1995 |
| DE | 4440419 | 5/1996 |
| DE | 19531121 | 2/1997 |
| DE | 19740079 | 3/1999 |
| DE | 19931046 | 1/2001 |
| EP | 0055674 | 7/1982 |
| EP | 0239884 | 10/1987 |
| EP | 0396062 | 11/1990 |
| EP | 0401930 | 12/1990 |
| EP | 0408892 | 1/1991 |
| EP | 0420123 | 4/1991 |
| EP | 0424648 | 5/1991 |
| EP | 0444496 | 9/1991 |
| EP | 0447968 | 9/1991 |
| EP | 0532322 | 3/1993 |
| EP | 0550911 | 7/1993 |
| EP | 0560593 | 9/1993 |
| EP | 0566454 | 10/1993 |
| EP | 0 276 425 | 11/1993 |
| EP | 0572090 | 12/1993 |
| EP | 0 617 563 | 9/1994 |
| EP | 0 624 040 | 11/1994 |
| EP | 0682452 | 11/1995 |
| EP | 0 705 036 | 4/1996 |
| EP | 0 721 253 | 7/1996 |
| EP | 0 723 369 | 7/1996 |
| EP | 0 742 669 | 11/1996 |
| EP | 0752767 | 1/1997 |
| EP | 0753964 | 1/1997 |
| EP | 0762751 | 3/1997 |
| EP | 0 774 866 | 5/1997 |
| EP | 0772360 | 5/1997 |
| EP | 0775417 | 5/1997 |
| EP | 0784405 | 7/1997 |
| EP | 0 805 594 | 11/1997 |
| EP | 0 823 798 | 2/1998 |
| EP | 0822718 | 2/1998 |
| EP | 0827340 | 3/1998 |
| EP | 0 834 798 | 4/1998 |
| EP | 0 836 321 | 4/1998 |
| EP | 0 837 599 | 4/1998 |
| EP | 0848554 | 6/1998 |
| EP | 0849948 | 6/1998 |
| EP | 0851681 | 7/1998 |
| EP | 0852442 | 7/1998 |
| EP | 0854645 | 7/1998 |
| EP | 0854654 | 7/1998 |
| EP | 0880856 | 12/1998 |
| EP | 0905985 | 3/1999 |
| EP | 0924927 | 6/1999 |
| EP | 0935393 | 8/1999 |
| EP | 0944253 | 9/1999 |
| EP | 0963119 | 12/1999 |
| EP | 0988876 | 3/2000 |
| EP | 1095504 | 5/2001 |
| EP | 0 725 539 | 7/2002 |
| EP | 0 945 003 | 8/2003 |
| FR | 2662895 | 12/1991 |
| GB | 1554411 | 10/1979 |
| GB | 2034995 | 6/1980 |
| GB | 2126002 | 3/1984 |
| GB | 2185670 | 7/1987 |
| GB | 2256546 | 12/1992 |
| GB | 2256549 | 12/1992 |
| GB | 2309134 | 7/1997 |
| JP | 55-28691 | 2/1980 |
| JP | 58-137334 | 8/1983 |
| JP | 58-196738 | 11/1983 |
| JP | 58-210776 | 12/1983 |
| JP | 59-15348 | 1/1984 |
| JP | 59-141878 | 8/1984 |
| JP | 60-61935 | 4/1985 |
| JP | 61-050470 | 3/1986 |
| JP | 61-074476 | 4/1986 |
| JP | 61-105642 | 5/1986 |
| JP | 62-060370 | 3/1987 |
| JP | 62-060384 | 3/1987 |
| JP | 63-234679 | 9/1988 |
| JP | 1018380 | 1/1989 |
| JP | 1183380 | 7/1989 |
| JP | 1-307944 | 12/1989 |
| JP | 2-048879 | 2/1990 |
| JP | 03-21184 | 1/1991 |
| JP | 3-021184 | 1/1991 |
| JP | 03063990 | 3/1991 |
| JP | 04-079053 | 3/1992 |
| JP | 04-227380 | 8/1992 |
| JP | 05-183826 | 7/1993 |
| JP | 5-324450 | 12/1993 |
| JP | 06-021907 | 1/1994 |
| JP | 06-38165 | 2/1994 |
| JP | 06-504165 | 5/1994 |
| JP | 06-243539 | 9/1994 |
| JP | 6-319874 | 11/1994 |
| JP | 07-020254 | 1/1995 |
| JP | 07-050259 | 2/1995 |
| JP | 07-59072 | 3/1995 |
| JP | 7-66784 | 3/1995 |
| JP | 7-73124 | 3/1995 |
| JP | 07-076592 | 3/1995 |
| JP | 07-502629 | 3/1995 |
| JP | 07-123326 | 5/1995 |
| JP | 7-131771 | 5/1995 |
| JP | 07-135621 | 5/1995 |
| JP | 07-147657 | 6/1995 |
| JP | 07-160732 | 6/1995 |
| JP | 07-193762 | 7/1995 |
| JP | 07-288759 | 10/1995 |
| JP | H07509817 | 10/1995 |
| JP | 07-321748 | 12/1995 |
| JP | 08-32528 | 2/1996 |
| JP | 08-32538 | 2/1996 |
| JP | 08-125497 | 5/1996 |
| JP | 08-506941 | 7/1996 |
| JP | 08-251122 | 9/1996 |
| JP | 09-037151 | 2/1997 |
| JP | 9-37168 | 2/1997 |
| JP | 09-037172 | 2/1997 |
| JP | 09-102827 | 4/1997 |
| JP | 10-143340 | 5/1998 |
| JP | 10-143349 | 5/1998 |
| JP | 10-512420 | 11/1998 |
| JP | 2838892 | 12/1998 |
| JP | 2001-213595 | 8/2001 |
| JP | 2002-279969 | 9/2002 |
| JP | 3965462 | 8/2007 |
| MX | 9800004 | 11/1998 |
| WO | WO 86/01359 | 2/1986 |
| WO | WO 86/01962 | 3/1986 |
| WO | WO 87/03766 | 6/1987 |

(56) References Cited

FOREIGN PATENT DOCUMENTS

| | | |
|---|---|---|
| WO | WO 88/04057 | 6/1988 |
| WO | WO 88/04507 | 6/1988 |
| WO | WO 89/02682 | 3/1989 |
| WO | WO 89/03085 | 4/1989 |
| WO | WO 89/12370 | 12/1989 |
| WO | WO 90/01243 | 2/1990 |
| WO | WO 90/07844 | 7/1990 |
| WO | WO 90/15507 | 12/1990 |
| WO | WO 91/00670 | 1/1991 |
| WO | WO 91/18476 | 11/1991 |
| WO | WO 92/04801 | 3/1992 |
| WO | WO 93/04473 | 3/1993 |
| WO | WO 93/05452 | 3/1993 |
| WO | WO 93/06692 | 4/1993 |
| WO | WO 93/11638 | 6/1993 |
| WO | WO 93/11639 | 6/1993 |
| WO | WO 93/11640 | 6/1993 |
| WO | WO 93/22877 | 11/1993 |
| WO | WO 93/23957 | 11/1993 |
| WO | WO 94/13096 | 6/1994 |
| WO | WO 94/13107 | 6/1994 |
| WO | WO 94/14281 | 6/1994 |
| WO | WO 94/14282 | 6/1994 |
| WO | WO 94/14283 | 6/1994 |
| WO | WO 94/14284 | 6/1994 |
| WO | WO 94/17630 | 8/1994 |
| WO | WO 94/17633 | 8/1994 |
| WO | WO 94/19881 | 9/1994 |
| WO | WO 94/19909 | 9/1994 |
| WO | WO 94/21085 | 9/1994 |
| WO | WO 94/23383 | 10/1994 |
| WO | WO 94/24826 | 10/1994 |
| WO | WO 94/29811 | 12/1994 |
| WO | WO 94/29840 | 12/1994 |
| WO | WO 94/30008 | 12/1994 |
| WO | WO 95/01056 | 1/1995 |
| WO | WO 95/01058 | 1/1995 |
| WO | WO 95/01059 | 1/1995 |
| WO | WO 95/06389 | 3/1995 |
| WO | WO 95/07003 | 3/1995 |
| WO | WO 95/10910 | 4/1995 |
| WO | WO 95/15649 | 6/1995 |
| WO | WO 95/15657 | 6/1995 |
| WO | WO 95/15658 | 6/1995 |
| WO | WO 95/16568 | 6/1995 |
| WO | WO 95/19092 | 7/1995 |
| WO | WO 95/26608 | 10/1995 |
| WO | WO 95/28055 | 10/1995 |
| WO | WO 95/28799 | 10/1995 |
| WO | WO 95/30961 | 11/1995 |
| WO | WO 95/31069 | 11/1995 |
| WO | WO 95/32583 | 11/1995 |
| WO | WO 95/32585 | 11/1995 |
| WO | WO 95/32587 | 11/1995 |
| WO | WO 96/07270 | 3/1996 |
| WO | WO 96/08109 | 3/1996 |
| WO | WO 96/08113 | 3/1996 |
| WO | WO 96/09721 | 3/1996 |
| WO | WO 96/13013 | 5/1996 |
| WO | WO 96/13932 | 5/1996 |
| WO | WO 96/13935 | 5/1996 |
| WO | WO 96/17467 | 6/1996 |
| WO | WO 96/17473 | 6/1996 |
| WO | WO 96/21990 | 7/1996 |
| WO | WO-9620555 | 7/1996 |
| WO | WO 96/26605 | 8/1996 |
| WO | WO 96/27270 | 9/1996 |
| WO | WO 96/27982 | 9/1996 |
| WO | WO 96/27989 | 9/1996 |
| WO | WO 96/31980 | 10/1996 |
| WO | WO 96/34467 | 10/1996 |
| WO | WO 96/34486 | 10/1996 |
| WO | WO 96/34491 | 10/1996 |
| WO | WO 96/37996 | 11/1996 |
| WO | WO 96/38799 | 12/1996 |
| WO | WO 96/38962 | 12/1996 |
| WO | WO 96/41471 | 12/1996 |
| WO | WO 96/41472 | 12/1996 |
| WO | WO 96/41477 | 12/1996 |
| WO | WO 96/41478 | 12/1996 |
| WO | WO 97/02702 | 1/1997 |
| WO | WO 97/04595 | 2/1997 |
| WO | WO 97/07656 | 3/1997 |
| WO | WO 97/13368 | 4/1997 |
| WO | WO 97/17774 | 5/1997 |
| WO | WO 97/18675 | 5/1997 |
| WO | WO 97/26612 | 7/1997 |
| WO | WO 97/31480 | 8/1997 |
| WO | WO 97/41673 | 11/1997 |
| WO | WO 97/42763 | 11/1997 |
| WO | WO 97/45786 | 12/1997 |
| WO | WO 97/46943 | 12/1997 |
| WO | WO 97/47106 | 12/1997 |
| WO | WO 97/47143 | 12/1997 |
| WO | WO 97/48230 | 12/1997 |
| WO | WO 97/49237 | 12/1997 |
| WO | WO 97/49241 | 12/1997 |
| WO | WO 97/49242 | 12/1997 |
| WO | WO 97/50251 | 12/1997 |
| WO | WO 98/01825 | 1/1998 |
| WO | WO 98/06219 | 2/1998 |
| WO | WO 98/10589 | 3/1998 |
| WO | WO 98/16062 | 4/1998 |
| WO | WO 98/17063 | 4/1998 |
| WO | WO 98/17064 | 4/1998 |
| WO | WO 98/20675 | 5/1998 |
| WO | WO 98/21664 | 5/1998 |
| WO | WO 98/21877 | 5/1998 |
| WO | WO 98/23059 | 5/1998 |
| WO | WO 98/26569 | 6/1998 |
| WO | WO 98/26584 | 6/1998 |
| WO | WO 98/27723 | 6/1998 |
| WO | WO 98/28906 | 7/1998 |
| WO | WO 98/31148 | 7/1998 |
| WO | WO 98/41020 | 9/1998 |
| WO | WO 98/43183 | 10/1998 |
| WO | WO 98/47279 | 10/1998 |
| WO | WO 98/48566 | 10/1998 |
| WO | WO 98/56172 | 12/1998 |
| WO | WO 98/56173 | 12/1998 |
| WO | WO 99/01984 | 1/1999 |
| WO | WO 99/04561 | 1/1999 |
| WO | WO 99/07142 | 2/1999 |
| WO | WO 99/14947 | 3/1999 |
| WO | WO 99/18722 | 4/1999 |
| WO | WO 99/29109 | 6/1999 |
| WO | WO 99/30491 | 6/1999 |
| WO | WO 99/31480 | 6/1999 |
| WO | WO 99/45700 | 9/1999 |
| WO | WO 99/45701 | 9/1999 |
| WO | WO 99/45702 | 9/1999 |
| WO | WO 99/52285 | 10/1999 |
| WO | WO 99/56466 | 11/1999 |
| WO | WO 99/56473 | 11/1999 |
| WO | WO 99/60783 | 11/1999 |
| WO | WO 99/60789 | 11/1999 |
| WO | WO 00/04706 | 1/2000 |
| WO | WO 00/04708 | 1/2000 |
| WO | WO 00/05889 | 2/2000 |
| WO | WO 00/11865 | 3/2000 |
| WO | WO 00/13415 | 3/2000 |
| WO | WO 00/16548 | 3/2000 |
| WO | WO 00/27122 | 5/2000 |
| WO | WO 00/28734 | 5/2000 |
| WO | WO 00/33160 | 6/2000 |
| WO | WO 00/33224 | 6/2000 |
| WO | WO 00/33560 | 6/2000 |
| WO | WO 00/33573 | 6/2000 |
| WO | WO 00/49801 | 8/2000 |
| WO | WO 00/79798 | 12/2000 |
| WO | WO 01/01677 | 1/2001 |
| WO | WO 01/06784 | 1/2001 |
| WO | WO 01/15438 | 3/2001 |
| WO | WO 01/35662 | 5/2001 |

(56) References Cited

FOREIGN PATENT DOCUMENTS

| WO | WO 01/89213 | 11/2001 |
|----|----|----|
| WO | WO 02/31731 | 4/2002 |
| WO | WO 02/084992 | 10/2002 |

OTHER PUBLICATIONS

"A Framework for Interactive Television Based on Internet Standards," Backer et al.
"BBC Online—Schedules" web page. This web page is located at http://www.bbc.co.uk/schedules/ (as printed from the Internet on Oct. 19, 1999 and being dated as early as May 24, 1997).
"Dial M for Movie," Periodical Funkschau, vol. 11/1994, pp. 78-79 (with full translation),.
"Dialing the printed page" ITT in Europe Profile, 11/Spring 1977.
"Growing US interest in the Impact of viewdata," Computing Weekly, Jul. 20, 1978,.
"Open TV für Interaktives Fernsehen: Trend and Technology," Periodical RFE, vol. 9/95, p. 100 (with full English translation).
"Teletext presents the alternative view," Financial Times, Oct. 24, 1977.
"Three men on a Viewdata bike," The Economist, Mar. 25, 1978.
"UVSG Offers System-Specific Web Site Development for OPS," press release of United Video Satellite Group, Apr. 12, 1996.
"UVSG Teams With Microsoft on Internet Information Server," press release of United Video Satellite Group, Feb. 22, 1996.
"Viewdata and its potential impact in the USA: Final Report/vol. one. The UK Experience," Link and Butler Cox & Partners Limited, Oct. 1978.
"Viewdata moves in US but GEC may lose out," Computing Weekly, Jan. 25, 1978.
"Viewdata Service —Terminal Specification," British Post Office, Issue 5, Aug. 1978.
"Web TV and Its Consumer Electronics Licensees Debut First Internet Television Network and Set-Top Box," Jul. 10, 1996 <http://www.ohlfs.com/keith/self/webtv/home/HTML/home.license.html>.
Armstrong, Larry, "Channel-Surfing's next wave: Henry Yuen's interactive TV guide takes on TCI and Viacom," BusinessWeek, Jul. 31, 1995.
Arnold, William F., "Britain to get wired city—via telephone," Electronics. Mar. 4, 1976, at 76.
Blahut et al., "Interactive eievision," Proceedings of the IEEE, Jul. 1995.
Boyd-Merritt, Rick, "Television wires two-way video," Electronic Engineering Times, Apr. 25, 1994,.
Brugliera, Vito, "Digital On-Screen Display: A New Technology for the Consumer Interface" (Jun. 11, 1993).
Day, Rebecca, "The Great PC/TV Debate," OEM Magazine, Jul. 1, 1996.
DirecTv Plus2 System, RCA, Thompson Consumer Electronics, Inc. (1999).
DiRosa, S., "BIGSURF Netguide," Jul. 1995, vol. 3.1 (Sections 18, 21, and 28—renumbered as pp. 1-27).
Eitz, Gerhard, "Zukünftige Informations- Und Datenangebote Beim Digitalen Femsehen—EPG Und "Lesezeichen","  Rundfunktechnische Mitteilungen, vol. 41, pp. 67-72, Jun. 1997. (full translation attached).
Hobbes Internet Timeline, Mar. 22, 2007.
Holland, Gary L,, "NAPLPS standard defines graphics and text communications," EDN, Jan. 10, 1985, at 179.
lizuka, Honbashi, Kuwana, The Overview of Internet TV Guide Japan, Building Internet TV Guide Service 1 and 2, the 53rd National Conference Proceedings, Japan, Information Processing Society of Japan, Sep. 6, 1996 p, 3-227 to 230 (partial translation).
Instruction Manual *Using StarSight 2*, StarSight Telecast, Inc., 1994.
Kai et al., Development of a Simulation System for Integrated Services Television, Report from Information Processing Society of Japan, Japan, Sep. 13, 1996, vol. 96, No. 90 p. 13-20. (partial translation).
Keith Lynch's timeline of net related terms and concepts, Mar. 22, 2007.
Large, Peter, "Throw away the books—Viewdata's coming," Guardian, Jan. 10, 1978.
Large, Peter, "Viewdata, the invention that brings boundless advice and information to the home, also sets a test for the Post Office," Financial Guardian, Jun. 29, 1978.
Leftwich, Jim & Schein, Steve, *StarSight interactive Television Program Guide, Phase III*, Functional/Interactional Architecture Specification Document, Orbit Interaction, Palo Alto, California.
Leftwich, Jim, Lai, Willy & Schein, Steve, *StarSiaht Interactive Television Program Guide, Phase IV*, Functiona/Interactional Architecture Specification Document, Orbit Interaction, Palo Alto, California, published before Apr. 19, 1995.
LISTS> What's on Tonite TV Listings Internet Article, [Online], Jan. 28, 1995, XP002378869 Retrieved from the Internet: URL: wvvw.scout.wisc.edu/Projects/PastProjects/NH/95-01-31/0018.html> [retrieved on Apr. 28, 2006] *the whole document*.
Little et al., ACM Multimedia 93 Proceedings, A Digital On-Demand Video Service Suporting Content-Based Queries, pp. 427-436, Jul. 1993.
Lloyd, John, "Impact of technology," Financial Times, Jul. 1978.
Miller, Mathew D., "A Scenario for the Deployment of Interactive Multimedia Cable Television Systems in the United States in the 1990s," IEEE, 1994.
Money, Steve A,, "Teletext and Viewdata," Butterworth & Co, Ltd., London, 1979.
Mosley, J.D., "NAPLPS chip sets, though scarce, satisfy limited US videotex demand," EDN, Mar. 21, 1985, at 57.
Neumann, Andreas, "WDR Online Aufbau Und Perspektiven Automatisierter Online-Dienste Im WDR," Rundfunktechnische Mitteilungen, vol. 41, pp, 56-66, Jun. 1997, (full translation).
Owen, Kenneth, "How dial-a-fact is coming closer to home," The Times, Sep. 30, 1977.
Owen, Kenneth, "Why the Post Office is so excited by its plans for a TV screen information service," The Times, Sep. 26, 1976.
Poole, James, "Demand for Viewdata grows," Sunday Times, Feb. 10, 1977.
Printout from Google News Archives, Mar. 22, 2007.
Prodigy Launches Interactive TV Listing, Apr. 22, 1994, Public Broadcasting Report.
Qayyum, Hamid, "Using IVDS and VBI for Interactive Television," IEEE, Jun. 10, 1996.
Rajapakshe et al., "Video on demand," (last modified Jun. 1995) <http://www.doc.ic.ac.uk/~nd/surprise_95 /joumal/vol4/shr/report.html>.
Rath et al., "Set-Top Box Control Software: A Key Component in Digital Video," Philips Journal of Research, vol. 50, No. ½, 1996, at 185.
Research Disclosure XP 000599701 "Electronic Program Guide via Internet," ed. by Kenneth Mason, GB# 385, May 1996, p. 276.
Rogers, C., "Telcos vs. Cable TV: The Global View," Sep. 1995, Report/Alternative Carriers, Data Communications, No. 13, New York, pp, 75, 76, 78, 80.
Rosch, Gary D,, "New data and information system set for commercial market trial," Telephony, Mar. 20, 1978, at 96.
Ruffler et al., "InfoRadio on Demand, WebTV and digiTaz— Telecommerce Case Studies," May 23, 1996.
Ryan, Margaret, "Interactive TV Takes a Corporate Twist," Electronic Engineering Times, Jul. 10, 1995.
Schauer, Tom: Internet Article, [Online] Sep. 28, 1995, XP002378870, Retrieved from the Internet: URL: www.vision2020.moscow.com/Archives/1995/9509/0058.html> [retrieved on Apr. 28, 2006] "the whole document".
Schmuckler, Eric, "A marriage that's made in cyberspace (television networks pursue links with online information services)," May 16, 1994, Mediaweek, v4, n20, p22 (3).
Sharpless et al., "An advanced home terminal for interactive data communication," Conf. Rec. Int. Conf. Commun. ICC '77, IEEE, Jun. 12-15, 1977, at 19.6-47.
St. John, Sandringham, "Dress rehearsal for the Prestel show," New Scientist, Jun. 1, 1978, at 586.

(56) References Cited

OTHER PUBLICATIONS

Statement in an Examination Report dated Aug. 2, 1999 for a counterpart foreign application filed in New Zealand in which the foreign Examiner alleges that he has used "The Internet to access television listings for BBC World television as far back as mid 1996 . . . ".
Stickland, D.C., "It's a common noun," Rhe Economist, Jun. 5, 1978.
Stokes, Adrian, "The viewdata age: Power to the People," Computing Weekly, Jan. 1, 1979.
The clickTV television program guide website of TVData of Queensbury, New York, This website is located at www.clicktv.com (as printed from the Internet on Sep. 1, 1998).
The InfoBeat television program guide website of InfoBeat, Inc, This website is located at www.infobeat.com (as printed from the Internet on Dec. 8, 1997).
The television program guide website of Gist Communications, Inc. of New York, New York. This website is located at www.gist.com (as printed from the Internet on Aug. 14, 1997).
The television program guide website of TV Guide Entertainment Network. This website is located at www.tvguide.com (as printed from the Internet on Aug. 14-22, 1997).
TV Guide movie database Internet web pages printed on Aug. 12, 1999 (9 pages).
TV Guide Online Set for Fall, Entertainment Marketing Letter, Aug. 1994.
VideoGuide, Videoguide User's Manual, pp. 1-27.
Whitehorn, Katharine, "Viewdata and you," Observer, Jul. 30, 1978.
Wikipedia article on CompuServe, Mar. 22, 2007.
Wittig, H. et al., intelligent Media Agents in interactive Television Systems Proceedings of the International Conference on Multimedia Computing and Systems, Los Alamitos, CA, US, May 15, 1995-May 18, 1995, pp. 182-189, XP00603484 p. 183, left hand column, paragraph 2, p. 184, right-hand column, paragraph 2 figure 4.
Yoshida. Junko, "Interactive TV a Blur," Electronic Engineering Times, Jan. 30, 1995.
U.S. Appl. No. 60/022,826, filed Jul. 26, 1996, Schein et al.
U.S. Appl. No. 60/015,648, filed Apr. 19, 1996, Klosterman et al.
U.S. Appl. No. 08/987,740, filed Dec. 9, 1997, Boyer et al.
U.S. Appl. No. 09/330,793, filed Jun. 11, 1999, Boyer et al.
U.S. Appl. No. 09/262,658, filed Mar. 3, 1999, Rosenthal et al.
U.S. Appl. No. 09/375,901, filed Aug. 17, 1999, Knudson.
U.S. Appl. No. 09/410,332, filed Oct. 1, 1999, Knudson et al.
U.S. Appl. No. 09/357,941, filed Jul. 16, 1999, Knudson et al.
U.S. Appl. No. 09/604,470, filed Jun. 26, 2000, Ellis et al.
"'Duck Tales,' (1987)[TV Series 1987-1990]" Internet Movie Database (IMDB) [Retrieved on Apr. 7, 2007].
"272OR Satellite Receiver User's Guide," General Instrument, 1991, pp. 58-61.
"Addressable Converters: A New Development at CableData," Via Cable, vol. 1, No. 12, Dec. 1981.
"Bell Atlantic Buys Cable TV Company for $22bn," Financial Times (London), Oct. 14, 1993 p. 65.
"Cable Television Equipment," Jerrold Communications Publication, dated 1992 and 1993, pp. 8-2.1 to 8-6 and 8-14.1 to 8-14.3.
"Computer Network: Current Status and Outlook on Leading Science and Technology," Bureau of Science & Technology (Japan), vol. 1, Dec. 1986.
"Creation/Modification of the Audio Signal Processor Setup for a PC Audio Editor," IBM Technical Disclosure Bulletin 30(10):367-376 (Mar. 1988).
"D2B-Home Bus Fur Audio and Video," Selektor, Apr. 1990, pp. 10, 12.
"Dial M for Movie", Funkschau 11/94 Perspektiven, Video on Demand, pp. 78-79. (English language translation attached).
"Digital Video Broadcasting (DVB); DVB specification for data broadcasting," European Telecommunication Standards Institute, Draft EN 301 192 V1.2.1 (Jan. 1999).
"Enhanced Content Specification," "ATVEF," from the internet at http://www.atvef.com/library/spec.html, printed Aug. 22, 2001, the document bears a Copyright date of 1998, 1999, 2000.

"Facsimile Transmission," NHK Research Monthly Report, Dec. 1987(Unknown author).
"Getting Started" Installation Guide, "Using StarSight 1" Manual and Remote Control "Quick Reference Guide."
"Interactive Computer Conference Server," IBM Technical Disclosure Bulletin 34(7A):375-377 (Dec. 1991).
"Interface Device for Conventional TVs to Improve Functionality," IBM Technical Disclosure Bulletin 36(7):53-54 (Jul. 1993).
"MSI Datacasting Systems," TV Communications Journal, Jan. 1973.
"Open TV fur interaktives Fernsehen," Trend and Technik, 9-95 RFE, p. 100. (English language translation attached).
"Open TV Launches OpenStreamer™ Technology for Broadcasters to Deliver First Ever Real-Time Digital Interactive Television," from the internet at http://www.opentv.com/news/openstreamer_press_final.htm, printed on Jun. 28, 1999, the document bears a copyright date of 1999.
"Prevue Networks and OpenTV(R) Agree to Work Together on Deploying Interactive Program Guides Worldwide," from the internet at http://www.opentv.com/news/prevuefinal.htm, printed on Jun. 28, 1999.
"Probe XL Brochure, Auto Tote Systems Inc.," (Newark, Delaware) (undated) 57 pgs.
"Prodigy Launches Interactive TV Listing", Apr. 22, 1994 Public Broadcasting Report.
"Technological Examination & Basic Investigative Research Report on Image Databases," Japan Mechanical Engineering Organization Int'l Society for the Advancement of Image Software, Japan, Mar. 1988.
"The New Media and Broadcast Policy: An Investigation & Research Conference Report on Broadcasting Diversification," Radio Regulatory Bureau, Japan Ministry of Posts & Telecommunications, Mar. 1982.
"TV Guide Online Set for Fall", Entertainment Marketing Letter, Aug. 1994.
"TV Listings Functional Spec.," Time Video Information Services, Inc., undated.
"Windows 98 Feature Combines TV, Terminal and the Internet," New York Times, Aug. 18, 1998.
Advertisement for "TV Decisions," Cable Vision, Aug. 4, 1986.
Alexander, "Visualizing cleared-off desktops," Computerworld, May 6, 1991, p. 20.
Antonoff, "Stay Tuned for Smart TV," Popular Science, Nov. 1990, pp. 62-65.
Bach et al., "Multimedia TV Set, Part 1" Radio-Fernsehen Elektronik (RFE), Sep. 1996, pp. 28, 30, 31. (English language translation attached.).
Bach et al., "Multimedia TV Set, Part 2 and Conclusion," Radio-Fernsehen Elektronik (RFE), Oct. 1996, pp. 38-40. (English language translation attached.).
Baer, "Innovative Add-On TV Products," IEEE Transactions on Consumer Electronics, vol. CE-25, Nov. 1979, pp. 765-771.
Bensch, "VPV Videotext Programs Videorecorder," IEEE Paper, Jun. 1988, pp. 788-792.
Bestler, "Flexible Data Structures and Interface Rituals for Rapid Development of OSD Applications," Proceedings from the Eleven Technical Sessions, 42nd Annual Convention and Exposition and Exploration of the NCTA, San Francisco, CA Jun. 6-9, 1993, pp. 223-236. Jun. 6, 1993.
Brochure, "A New Approach to Addressability," CableData, undated.
Brochure, "Westar and Videotoken Network Present The CableComputer," Revised Aug. 15, 1985 (Plaintiff's 334).
Brochure, Time Inc., "Now, Through the Advances of the Computer Age, You Can Get the Information You Want, When You Want It. Instantly and Conveniently, on Your Home TV Screen," Time Teletext, Time Video Information Services, Inc., undated (V 79167-79175).
Brochure, VTN "Videotoken Network, New Dimension Television," Dec. 1985 (Plaintiff's Exhibit 313).
Cable Computer User's Guide, Rev. 1, Dec. 1985 (Plaintiff's Exhibit 289).
CableData, Roseville Consumer Presentation, Mar. 1985.

(56) References Cited

OTHER PUBLICATIONS

Carne, "The Wired Household," IEEE Spectrum, vol. 16 No. 10, Oct. 1979, pp. 61-66.
Chan, "Learning Considerations in User Interface Design: The Room Model," Publication of the Software Portability Laboratory, University of Waterloo, Ontario, Canada, Jul. 1984.
Chang et al., "An Open-Systems Approach to Video on Demand," IEEE Communications Magazine, May 1994, pp. 68-80.
Christodoulakis et al., "Browsing Within Time-Driven Multimedia Documents," publication of the Institute for Computer Research, University of Waterloo, Waterloo, Ontario, Canada Jul. 1988 pp. 219-227.
Office Actions and Replies from U.S. Appl. No. 10/453,388.
Cox et al, "Extended Services in A Digital Compression System," Proceedings from Eleven Technical Sessions: 42nd Annual Convention and Exposition of the National Cable Television Association, Jun. 1993, pp. 185-191.
Damouny, "Teletext Decoders—Keeping Up With the Latest Advances," IEEE Transactions on Consumer Electronics CE-30(3):429-435 (Aug. 1984).
Declaration Under 37 C.F.R. § 1.132 of Richard E. Glassberg, signed Oct. 20, 2006, filed Oct. 24, 2006, from U.S. Appl. No. 10/346,266.
Edwardson et al., "CEEFAX: A Proposed New Broadcasting Service," Journal of the SMPTE 83(1):14-19 (Jan. 1974).
Electronic Programme Guide (EPG); Protocol for a TV Guide using electronic data transmission, by European Telecommunication Standards Institute, May 1997, Valbonne, France, publication No. ETS 300 707.
European Examination Report dated Dec. 6, 2002 for Application No. EP 96917270.9.
European Search Report dated Nov. 19, 2002 from European Application No. 98944611.7.
European Telecommunication Standard, "Electronic Programme Guide (EPG); Protocol for a TV Guide using electronic data transmission," pp. 1-45, sections 1-11.12.7 and annex A-P, bearing a date of May 1997.
European Telecommunications Standards: Digital Broadcasting Systems for Television Sound and Data Services; Specification for Service Information (SI) in Digital Video Broadcasting (DVB) Systems, European Telecommunications Standards Institute, Dec. 1994.
Hartwig et al., "Broadcasting and Processing of Program Guides for Digital TV," Journal of the SMPTE, pp. 727-732, Oct. 1997.
Hedger, "Telesoftware: Home Computing Via Broadcast Teletext," IEEE Transactions on Consumer Electronics CE-25(3):279-287 (Jul. 1979).
Hiroshi et al, "Clearface: Translucent Multiuser Interface for TeamWorkStation," ECSCW, Sep. 1991, pp. 6-10.
Hiroshi et al, "Toward an Open Shared Workspace: Computer and Video Fusion Approach of Team Workstation," Communications of the ACM 34(12):37-50 (Dec. 1991).
Hoarty, "Multimedia on Cable Television Systems," Symposium Record Table TV Sessions, 18th International Television Symposium and Technical Exhibition, Montreux, Switzerland, Jun. 10, 1993, pp. 555-567.
Hofmann et al., "Videotext Programmiert Videorecorder," Rundfunktechnischen Mitteilungen, Broadcast Engineering Reports 26(6):254-257, Nov.-Dec. 1982.
Installation Guide, "Getting Started 1" Manual and Remote Control "Quick Reference Guide."
Instructional Manual, "Sonic the Hedgehog," Sega of America, 1992.
J. Roizen, "Teletext in the USA," Journal of the SMPTE, pp. 602-610, Jul. 1981.
James, "Oracle—Broadcasting the Written Word," Wireless World, pp. 314-316, Jul. 1973.
Judice, "Move Over Cable, Here Comes Video Via Voice Lines," Network World, Sep. 1986, p. 26.
Karstad, "Microprocessor Control for Color-TV Receivers," IEEE Transactions on Consumer Electronics CE-26:149-155 (May 1980).
Kornhaas, "Von der Textprogrammierung uber TOP zum Archivsystem," Radio Fernsehen Elektronik, vol. 40, No. 8, Aug. 30, 1991, pp. 465-468, XP 000240875 Veb Verlag Technik. Berlin, DE ISSN: 1436-1574.
Listing of computer code for operating system within the Cable Computer in 1985 (Plaintiff's Exhibit 298).
Listing of computer code for Video HTU Program (Plaintiff's Exhibit 299).
Lowenstein et al., "The Inevitable March of Videotex," Technology Review 88:22 (1985).
M/A-COM, Inc., "Videocipher II Satellite Descrambler Owner's Manual," dated Prior Feb. 1986, pp. 1-17.
Mack Daily, "Addressable Decoder with Downloadable Operation," Proceedings from the Eleven Technical Sessions, 42nd Annual Convention and Exposition of the NCTA, Jun. 6-9, 1993, pp. 82-89.
Mannes, "Smart Screens: Development of Personal Navigation Systems for TV Viewers," Video Magazine, Dec. 1993.
Mar. 19, 1985 letter from G. Knapp of CableData to R. Hansen of Weststar Communications, Inc. (Plaintiff's Exhibit 325).
Markowitz, "Companies Jump on Interactive Bandwagon," Discount Store News, Dec. 6, 1993, pp. 4 and 131.
McKenzie, "Oracle—An Information Broadcasting Service Using Data Transmission in the Vertical Interval," Journal of the SMPTE 83(1):6-10 (Jan. 1974).
Merrell, "Tac Timer," 1986 NCTA Technical Papers, pp. 203-206.
No subject, "Tom Schauer (tschauer@moscow.com) Thu, Sep. 28, 1995 16:46:48-700," XP-002378870 [Retrieved from the Internet Apr. 28, 2006].
Peddicord, "New on TV: You Bet Your Horse," The Sun, Baltimore Maryland Dec. 15, 1994, 1 pg.
Pfister, "Teletext: Its Time Has Come," Prepared for the IGC Videotext / Teletext Conference, Andover, Massachusetts, Dec. 14, 1982, pp. 1-11.
Prevue Guide Brochure, Spring 1984.
Prevue Guide Brochure, Spring 1994.
Rayers, "Telesoftware by Teletext," 1984 IEEE Conference Papers 240:323.
Robinson et al., "'Touch-Tone' Teletext, A Combined Teletext—Viewdata System," IEEE Transactions on Consumer Electronics CE-25(3):288-294 (Jul. 1979).
Roseville City Council Presentation, Mar. 13, 1985 (Defendant's Exhibit 226).
Schlender, "Couch Potatoes! Now It's Smart TV," Fortune, Nov. 20, 1989, pp. 111-116.
Sealfon, "High Tech TV," Photographic, Dec. 1984.
Sorce et al., "Designing a Broadband Residential Entertainment Service: A Case Study," GTE Laboratories Incorporated, undated, pp. 141-148.
Sunada et al, "Teletext Color Television Receiver Model C-29M950, C26M940," NEC Home Electronics , NEC Giho, 1987.
Supplementary European Search Report for Application No. EP 98 93 5889, completed on Sep. 28, 2001.
Sussman, "GTE Tunes In to Home TV Shopping," PC Week, Jun. 28, 1988, p. C15.
System as described in Cable Data ad.
System as described in DIP II ad.
Tech Notes: Product Updates from M/A-COM Cable Home Group, "Videocipher Owner's Manual Update," Issue No. 6, Feb. 1986.
Technical White Paper, "Open TV™ Operating Environment," (© 1998 OpenTV Inc.), pp. 1-12.
Technology: Turn on, tune in and print out—An experimental interactive television service is set to alter our viewing habits, Financial Times (London), Oct. 14, 1993, p. 11.
Transcript of the Deposition of John Roop, Oct. 1996, pp. 186-187.
Trial testimony of Michael Axford, *Prevue Interactive, Inc. and United Video Satellite Group, Inc.* v. *StarSight Telecast, Inc.*, May 9, 1998, pp. 186-187, 295-315, and 352-357.
Ueda et al, "Impact: An Interactive Natural-Motion-Picture Dedicated Multi-Media Authoring System," Communications of the ACM, Mar. 1991, pp. 343-350.
Using StarSight 2, Instruction Manual, StarSight Telecast, Inc., StarSight CB 1500 Customer Letter, 1994.
Various publications of Insight Telecast, 1992 and 1993.

(56) References Cited

OTHER PUBLICATIONS

Veith, "Television's Teletext," Elsevier Science Publishing Co., Inc, 1983, pp. 13-20, 41-51.
Videocipher Stipulation, May 1996.
VideoGuide, "VideoGuide User's Manual," pp. 1-27 (p. 11 is the most relevant).
U.S. Appl. No. 09/330,792, filed Jun. 11, 1699, Knudson et al.
U.S. Appl. No. 09/332,244, filed Jun. 11, 1999, Ellis et al.
U.S. Appl. No. 09/356,268, filed Jul. 16, 1999, Rudnick et al.
Leftwich et al., "StarSight Interactive Television Program Guide III", Functional/Interactional Architecture Specification Document, Orbit Interaction, Palo alto, California, Published before Apr. 19, 1995.
Lists>What's on Tonite! TV Listings (fwd), Internet article (On line), Jan. 28, 1995, XP 002378869 [Retrieved on Apr. 28, 2006].
Magid, Lawrence J. "Rewind, reply and unwind with new high-tech TV devices," *LA Times*, May 19, 1999. This document was printed from the internet on Jun. 6, 1999.
Money, "Ch. 10: Viewdata" Teletext and Viewdata pp. 112-123, 1979.

\* cited by examiner

150

| | | | |
|---|---|---|---|
| CHANNEL | 10:00 PM | 10:30 PM | 11:00 PM |
| 46 PUBLIC TELEVISION | THE DESERTS OF AFRICA | WILDLIFE | |
| 47 HBO | GHOST | TITANIC | |
| 48 VH-1 | BLUES BROTHERS | | |
| 49 ADU | PPV 1 | PPV 2 | PPV 3 |
| 50 WPTU | COOKING | | |

FIG. 4

PROGRAMMING 9:30-10:30 PM

170

MOVIES

| | | |
|---|---|---|
| GHOST | CHANNEL 47 (HBO) | 9:30 - 10:00 |
| TERMINATOR | CHANNEL 7 (PPV) | 8:00 - 10:00 |
| THE BIG RED ONE  /—171 | CHANNEL 2 (CBS) | 8:30 - 10:30 |
| THE BLUES BROTHERS | CHANNEL 48 (VH-1) | 10:00 - 11:30 |
| TITANIC | CHANNEL 47 (HBO) | 10:00 - 1:30 |
| WHEN HARRY MET SALLY | CHANNEL 4 (NBC) | 9:00 - 11:00 |

SPORTING EVENTS

| | | |
|---|---|---|
| NEW YORK GIANTS | CHANNEL 8 (WXBR) | 8:00 - 10:00 |
| YANKEE BASEBALL | CHANNEL 11 (WLIW) | 8:00 - 11:00 |

NEWS

| | | |
|---|---|---|
| LOCAL NEWS | CHANNEL 17 (WLIR) | 9:30 - 10:00 |
| NEWS EXTRA | CHANNEL 5 (FOX) | 10:00 - 10:30 |

ADULT

| | | |
|---|---|---|
| PAY-PER-VIEW #1 | CHANNEL 49 (ADU) | 10:00 - 10:30 |
| PAY-PER-VIEW #2 | CHANNEL 49 (ADU) | 10:30 - 11:00 |

FIG. 5

METHODS AND SYSTEMS FOR UPDATING FUNCTIONALITY OF A SET-TOP BOX USING MARKUP LANGUAGE

CROSS-REFERENCE TO RELATED APPLICATIONS

This application is a continuation of U.S. patent application Ser. No. 11/432,686, filed May 10, 2006 (now U.S. Pat. No. 8,010,979), which is a continuation of U.S. patent application Ser. No. 10/171,424, filed Jun. 12, 2002 (now U.S. Pat. No. 7,073,188), which is a continuation of U.S. patent application Ser. No. 09/227,358, filed Jan. 8, 1999 (now U.S. Pat. No. 6,442,755), which claims the benefit of U.S. provisional patent application No. 60/091,975, filed Jul. 7, 1998. These prior applications are hereby incorporated by reference herewith in their entireties.

BACKGROUND OF THE INVENTION

This invention relates to video systems, and more particularly, to interactive television program guide systems which provide for the flexible modification of program guide user screen layouts and program guide functionality.

Cable, satellite, and broadcast television systems provide viewers with a large number of television channels. Users have traditionally consulted printed television program schedules to determine the programs being broadcast at a particular time. More recently, interactive electronic television program guides have been developed that allow television program information to be displayed on a user's television.

Interactive program guides allow the user to navigate through television program listings using a remote control. In a typical program guide display, television listings are organized and displayed in subsets according to multiple selection criteria and are sorted in various ways. For example, one approach is to organize program listings into a grid.

With current interactive program guides, user screens (e.g., screens containing program listings) and program guide functionality are fixed. It is generally not possible to chance user screens or program guide functionality without downloading an entire new program guide application.

Accordingly, it would be desirable if a markup language could be used to provide for the downloading display characteristics of user screens and program guide functionality as plug-ins anytime, without modifying the code of the application.

It is therefore an object of the present invention to provide an interactive television program guide that arranges program guide display elements using a markup language.

It is also an object of the present invention to provide an interactive television program guide that indicates and selects program guide functionality using a markup language.

It is also an object of the present invention to provide an interactive television program guide that may be updated by downloading markup language documents without user intervention.

SUMMARY OF THE INVENTION

This and other objects of the invention are accomplished in accordance with the principles of the present invention by providing an interactive program guide system that has program guide display screen look and functionality assigned updated using markup language documents.

Program guide data is provided by a data source in a satellite uplink facility. This information is transmitted to a television distribution facility such as a cable headend via a satellite link. The television distribution facility distributes the information (and television programming signals) to user television equipment on which an interactive television program guide is implemented. One suitable distribution scheme involves transmitting television channels and distributing the information for program listings in the vertical blanking interval of one of the channels or in a sideband. Alternatively, the information for program listings may be provided on a television channel sideband, using an in-hand digital channel, using an out-of-band digital signal, or by any other suitable data transmission technique.

The user television equipment for receiving and processing the television program listings and program listings information may include a set-top box. The set-top box is also able to receive the television programming distributed by the television distribution facility. The program guide implemented on the set-top box processes television program listings information and generates display screens (e.g., an interactive television, program guide grid) for display, e.g., on a standard television monitor.

Program guide display elements may have a set of associated attributes. Display element attributes may include display element style and layout information (e.g., font size, font type, color, screen coordinates, etc.), actions as with the display element, or any other suitable attribute. Display item actions may be indicated and selected using the markup language documents. The markup language used may be any suitable markup language or system of marking up, or tagging, a document (e.g., text file) so that the document indicates user display screen layout and styling and program guide functionality. For example, the markup language document may contain HyperText Markup Language (HTML), Dynamic HyperText Markup language (DHTML), or Extensible Markup Language (XML) code. The program guide is programmed to interpret the markup language documents and generate the display screens and provide program guide functionality according to the documents.

The use of a markup language provides an interactive television program guide in which display screens may be modified by downloading markup language documents without user intervention and without modifying the code of the application. Application functionality may be modified by attaching documents to the different modules in the same manner. The use of a markup language also allows a control entity to control some of the appearance and functionality of the guide and to create enhanced features and promotions based on designing a screen layout with off-the-shelf markup language editors and/or viewers.

Further features of the invention, its nature and various advantages will be more apparent from the accompanying drawings and the following detailed description of the preferred embodiments.

BRIEF DESCRIPTION OF THE DRAWINGS

FIG. 4 is an illustrative program listings grid in accordance with the principles of the present invention.

FIG. 5 is an illustrative program listings list in accordance with the principles of the present invention.

DETAILED DESCRIPTION OF THE PREFERRED EMBODIMENTS

Figure 1:
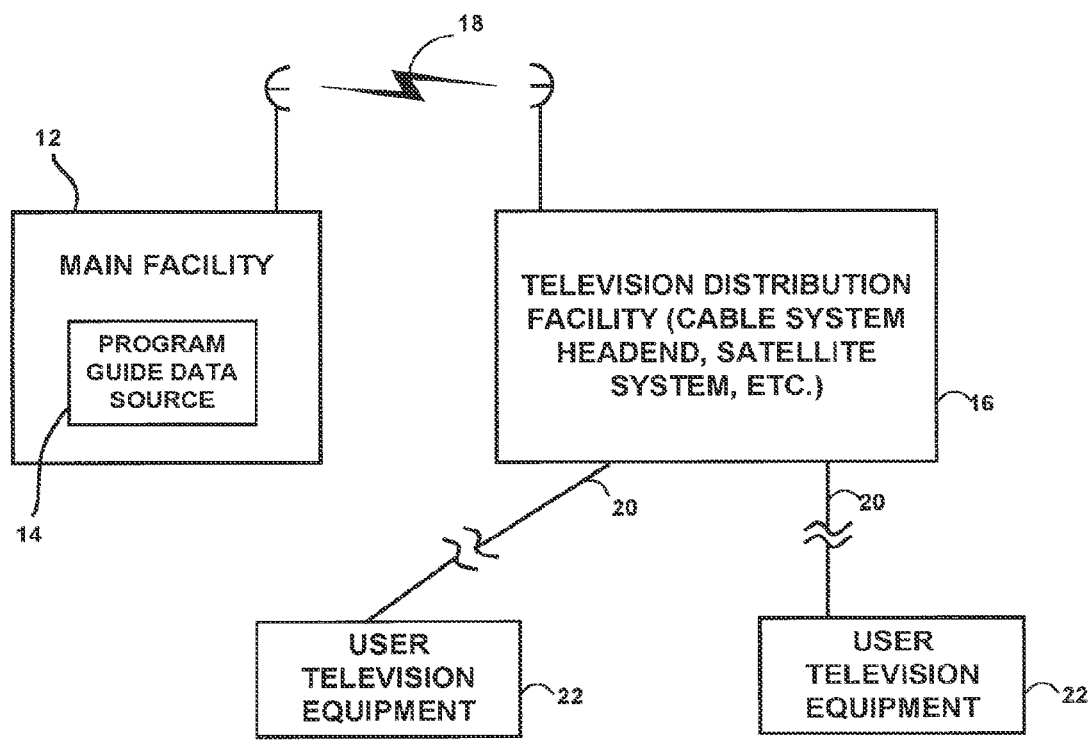
FIG. 1 is a schematic block diagram of a system in accordance with the principles of the present invention.

An illustrative system 10 in accordance with the present invention is shown in FIG. 1. Main facility 12 provides data from program guide data source 14 to television distribution facility 16 via communications link 18. There are preferably numerous television distribution facilities 16, although only one such facility is shown in FIG. 1 to avoid overcomplicating the drawing. Link 18 may be a satellite link, a telephone network link, a cable or fiber optic link, a microwave link, a combination such links, or any other suitable communications path. If it is desired to transmit video signals over link 18 in addition to data signals, a relatively high bandwidth link such as a satellite link may generally be preferred to a relatively low bandwidth link such as a telephone line. Television distribution facility 16 may be any appropriate distribution facility, such as a cable system headend, a broadcast distribution facility, or a satellite television distribution facility.

The program guide data transmitted by main facility 12 to television distribution facility 16 includes television program listings data (e.g., program times, channels, titles, and descriptions) and other program listings information for additional services other than television program listings (e.g., weather information, associated Internet web links, computer software, etc.). It may also contain markup language documents such as HyperText Markup Language (HTML), Dynamic HyperText Markup Language (DHTML), or Extensible Markup Language (XML) documents, for updating the display screen layouts and functionality of a program guide without user intervention.

The markup language documents may include the code of any suitable markup language or system of marking up, or tagging, a document (e.g., text file) so that the document arranges user display screen layout and styling and indicates program guide functionality. For example, the markup language document may contain DHTML, or XML code. The program guide is programmed to interpret the markup language documents and generate the display screens and provide program guide functionality according to the documents.

Television distribution facility 16 distributes the television program listings, additional data, and markup language documents to multiple users via communications paths 20. Each user has user television equipment 22 for displaying the television program listings information using an interactive television program guide. Communication paths 20 preferably have sufficient bandwidth to allow television distribution facility 16 to distribute television programming to user television equipment 22. If desired, television programming may be provided over separate communications paths (not shown).

Program guide data may be distributed to user television equipment 22 using any suitable scheme. For example, program guide data may be provided in a continuous stream or may be transmitted at a suitable time interval (e.g., once per hour). If transmitted continuously, it may not be necessary to store the data locally at user television equipment 22. Rather, user television equipment 22 may extract data "on the fly" as it is needed. If desired, television distribution facility 16 may poll user equipment 22 periodically for certain information (e.g., pay program account information or information regarding programs that have been purchased and viewed using locally-generated authorization techniques).

For clarity the present invention will be illustrated in connection with a system arrangement in which program guide data is distributed from a main facility to an interactive television program guide implemented on user television equipment, via a television distribution facility. Other suitable systems involve systems in which data is distributed to a program guide on user television equipment using other suitable distribution schemes, such as schemes involving data transmission over the Internet or the like. If desired, the interactive television program guide application may be implemented using a client-server architecture in which the primary processing power for the application is provided by a server located at, for example, the television distribution facility or the main facility and user television equipment acts as a client processor.

Figure 2:
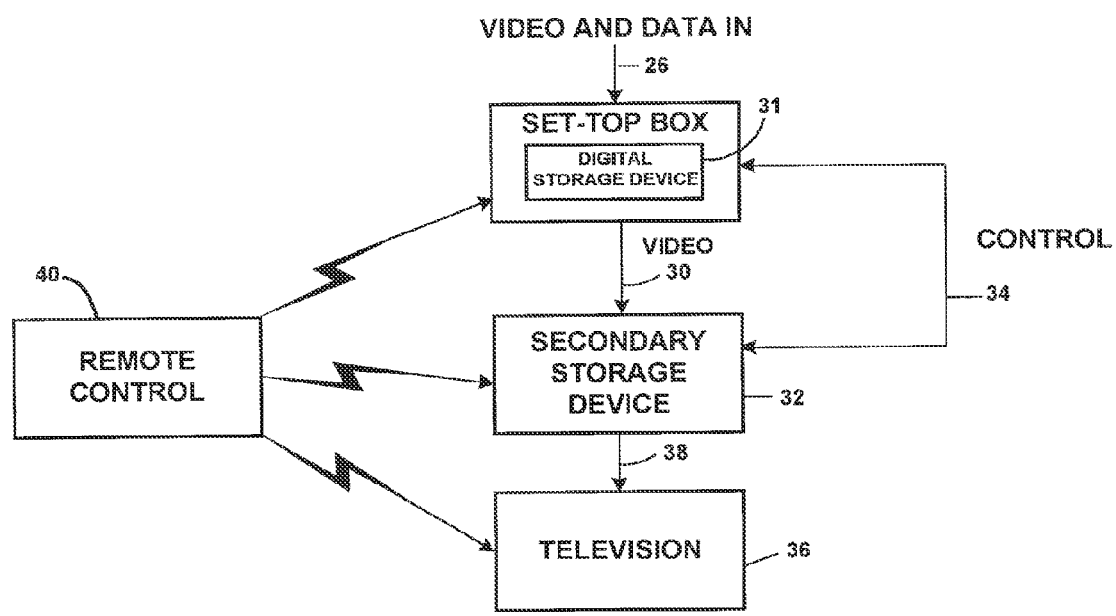
FIG. 2 is a schematic block diagram of illustrative user television equipment in accordance with the principles of the present invention.

An illustrative arrangement for user television equipment 22 is shown in FIG. 2. User television equipment 22 of FIG. 2 receives video and data from television distribution facility 16 (FIG. 1) at input 26. During normal television viewing, the user tunes set-top box 28 to a desired television channel. The signal for that television channel is then provided at video output 30. The outputted signal is typically either a radio-frequency (RF) signal on a predefined channel (e.g., channel 3 or 4), or a demodulated video signal, but may also be a digital signal provided to television 36 on an appropriate digital bus (e.g., a bus using the IEEE 1394 standard, (not shown)). The video signal at output 30 is received by optional secondary storage device 32.

Optional secondary storage device 32 can be any suitable type of analog or digital program storage device (e.g., a videocassette recorder, a digital video disc (DVD) player with the ability to record DVD discs, etc.). Program recording and other features may be controlled by set-top box 28 using control path 34. If secondary storage device 32 is a videocassette recorder, for example, a typical control path 34 involves the use of an infrared transmitter coupled to the infrared receiver in the videocassette recorder that normally accepts commands from a remote control such as remote control 40. Remote control 40 may be used to control set-top box 28, secondary storage device 32, and television 36.

The interactive television program guide may run on set-top box 28, on television 36 (if television 36 has suitable processing circuitry and memory), or on a suitable analog or digital receiver connected to television 36. The interactive television program guide may also run cooperatively on both television 36 and set-top box 28. Interactive television application systems in which a cooperative interactive television program guide application runs on multiple devices are described, for example, in Ellis U.S. patent application Ser. No. 09/186,598, filed Nov. 5, 1998 which is hereby incorporated by reference herein in its entirety.

The user may record programs and program data in digital form on optional digital storage device 31. Digital storage device 31 may be a writable optical storage device (such as a DVD player capable of handling recordable DVD discs), a magnetic storage device (such as a disk drive or digital tape), or any other digital storage device. Interactive television program guide systems that have digital storage devices are described, for example, in Hassell et al. U.S. patent application Ser. No. 09/157,256, which is hereby incorporated by reference herein in its entirety.

Digital storage device 31 can be contained in set-top box 28 or it can be an external device connected to set-top box 28 via an output port and appropriate interface. If necessary, processing circuitry in set-top box 28 formats the received video, audio and data signals into a digital file format. Preferably, the file format is an open file format such as the Motion Pictures Expert Group (MPEG) MPEG-2 standard. The resulting data is streamed to digital storage device 31 via an appropriate bus (e.g., a bus using the IEEE 1394 standard), and is stored on digital storage device 31.

Television 36 receives video signals from secondary storage device 32 via communications path 38. The video signals on communications path 38 may either be generated by secondary storage device 32 when playing back a prerecorded storage medium (e.g., a videocassette or a recordable digital video disc), by digital storage device 31 when playing back a prerecorded digital medium, may be passed through from set-top box 28, may be provided directly to television 36 from set-top box 28 if secondary storage device 32 is not included in user television equipment 22, or may be received directly by television 36. During normal television viewing, the video signals provided to television 36 correspond to the desired channel to which the user has tuned with set-top box 28. The video signals provided to television 36 may also be by set-top box 28 when set-top box 28 is used to play hack information stored on digital storage device 31.

Figure 3:
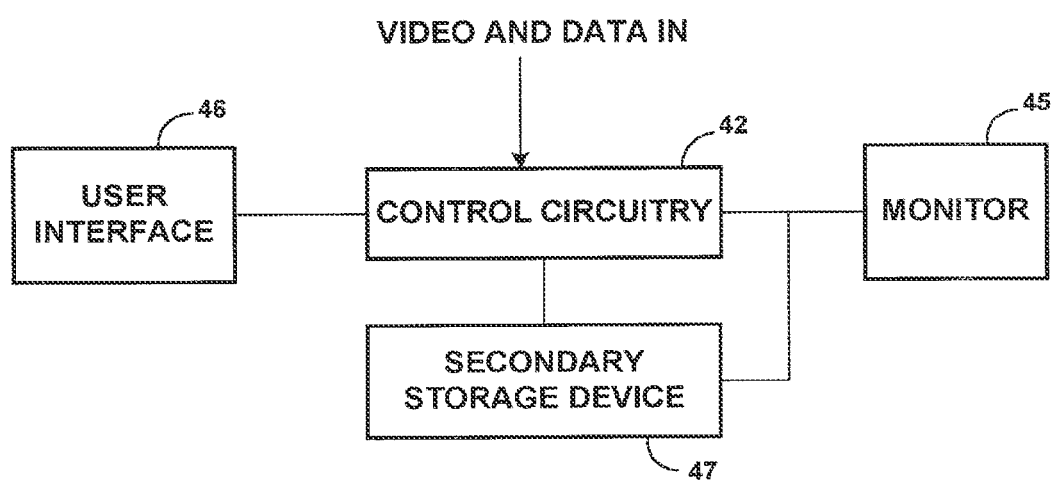
FIG. 3 is a generalized schematic block diagram of portions of the illustrative television equipment of FIG. 2.

A more generalized embodiment of user television equipment 22 (FIG. 2) is shown in FIG. 3. As shown in FIG. 3, control circuitry 42 of user television equipment 22 receives the program guide data, programming, and markup language documents from television distribution facility 16 (FIG. 1). Video signals are typically provided on multiple television channels. The program guide data and markup language documents may be provided on a television channel sideband, in the vertical blanking interval of a television channel, using an in-band digital channel, using an out-of-band digital signal, or by any other suitable data transmission technique.

Control circuitry 42 may be configured to interpret the markup language documents and to generate program guide display screens for display on monitor 45. The program guide display screens may be generated with display items at positions and with styles that are indicated by the markup language documents. In addition, actions assigned to display items by the markup language documents may be selected by control circuitry 42 to provide program guide functionality. The functions of control circuitry 42 may be provided using the set-top box arrangement of FIG. 2. Alternatively, these functions may be integrated into an advanced television receiver, personal computer television (PC/TV), or any other suitable arrangement. If desired, a combination of such arrangements may be used. In client-server based program guides, for example, control circuitry 42 may be contained in suitable equipment at television distribution facility 16.

The user controls the operation of user television equipment 22 with user interface 46. User interface 46 may be a pointing device, wireless remote control, keyboard, touchpad, voice recognition system, or any other suitable user input device. To watch television, the user instructs control circuitry 42 to display a desired television channel on monitor 45. To access the features of the program guide, the user instructs the program guide implemented on user television equipment 22 to generate a main menu or a desired program guide display screen for display on monitor 45.

When a user indicates a desire to view television programming information (e.g., by using a "guide" key on remote control 40), the program guide generates an appropriate program guide display screen, such as a program listings screen, for display on monitor 45. A program listings screen may contain one or more lists of programs organized according to multiple organization criteria (e.g., by program type, theme, or any other pre-defined or user defined and selectable criteria) and sorted in various ways (e.g., alphabetically). The program listings screen may be overlaid over a program being viewed by the user or overlaid over a portion of the program in a "browse" mode.

One approach is to organize program listings into a program listings grid. FIG. 4 illustrates the display of program listings in program listings grid 150. Program listings grid 150 may be divided into a number of columns 162 which correspond to program broadcast times and which may be equally spaced apart (e.g., in thirty-minute steps). Program listings may be displayed in the grid in sub-sets according to multiple selectable organization criteria and sorted in various ways. Program listings row 152 contains, for example, selectable program listings for THE DESERTS OF AFRICA and WILDLIFE on channel 46 (Public Television). Program listings row 154 contains, for example, selectable program listings for GHOST and TITANIC on channel 47 (HBO). Program listings row 156 contains, for example, selectable program listings for programs BLUES BROTHERS on shared channel 48 (VH-1). Program listing row 158 contains, selectable program listings for programs, PPV 1, and PPV 2 on channel 49 (ADU). Program listings row 160 contains a selectable program listing for COOKING on channel 49 (WPTU). The programs on each channel are typically different.

Program listings grid 150 may have movable cell highlight region 151, which highlights the current grid cell. The user may position highlight region 151 by entering appropriate commands with user interface device 52. For example, if user input interface device 52 has a keypad, the user can position highlight region 151 using "up," "down," "left," and "right" cursor keys. Remote program listings may also be panned left, right, up, and down by positioning highlight region 151 using the cursor keys on remote control 70. Alternatively, a touch sensitive screen, trackball, voice commands, or other suitable device may be used to move highlight region 151 or to select program listings without the use of highlight region 151. In still another approach, the user may speak a television program listing into a voice request recognition system. Any other suitable approach may be used.

After a user selects a program listing, the interactive program guide may provide the use with the opportunity to access a number of program guide features. For example, the user may access additional information (typically text or graphics, but possibly video and other information) about the listing, set a reminder, schedule an associated program for recording, set parental control features, set and navigate through favorite channels, or any other suitable program guide feature.

Program listings may also be displayed for the user in a list. FIG. 5 illustrates a program listings display screen having a program listings list displayed in accordance with the principles of the present invention. Scrollable program listings lists may display program listings in subsets according to user-selected organization criteria. Any suitable organization criteria and sorting scheme may be used. Scrollable program listings list 170 of FIG. 8, for example, organizes program listings according to program type and then sorts the listings alphabetically in each sub-set. The television program listings display screen of FIG. 5 also has movable cell highlight region 171 for moving within the list and selecting listings.

Program guide display screens may display a number of display elements such as program listings grid 150, program listings list 170, or any other suitable display element. Display elements may be arranged or styled using the markup language documents. Program guide functions may be indicated and selected using the markup language documents. Preferably, the markup language used is a standardized and widely accepted markup language, such as HTML, DHTML, or XML. The program guide is also programmed to interpret the markup language documents. The program guide is programmed to generate display screens and select program guide functionality according to the markup language documents.

Display screen style and layout and program guide functionality may be set initially for the program guide and later modified by the markup language documents supplied by main facility 12 (FIG. 1) to the interactive television program guide. In practice, when the program guide is going to be updated with a new markup language document an operator at a main facility, television distribution facility, or other interested facility generates a desirable markup language document using any suitable word processor or markup language document editor. The markup language document may be provided to the interactive program guide manually or automatically (e.g., at a predefined time). The markup language document is provided to, stored by, and interpreted by the interactive program guide without the intervention of the user. This provides for allowing an operator to centrally update the display characteristic and functionality of the program guide without user intervention.

Display elements are defined using a non-markup language approach and are preprogrammed into the program guide. Display elements may, for example, be programmed into the interactive program guide using any suitable programming language (e.g. Visual BASIC, C++, etc.). The markup language documents may organize display element attributes (e.g., style, layout, and action attributes) into finite sets of display element attributes which may be a subset of the attributes actually programmed into the program guide. The sets of display element attributes may be assigned to the display elements using indicators, or tags. The tags may indicate where to place the defined display elements on the program guide display screen. The tags may also indicate styles to be applied to the display elements. Preferably, the display elements are programmed to render themselves to the program guide display screen at the position and with the style defined in the markup language document. The defined display elements may include any suitable program guide display screen element, such as advertisement elements, program listings grid elements, video window elements, text window elements, or any other suitable display screen or standard markup language element.

Program guide functions are defined using a non-markup language approach and are preprogrammed into the program guide. Functions may, for example, be programmed into the program guide using any suitable programming language (e.g. Visual BASIC, C++, etc.). Program guide functionality may be apparent to the user through display element actions, or may be transparent. Any suitable display element action may be assigned and selected using markup language documents. For example, one action may be to replace a partial screen program listings grid (e.g., grid 150) with a full-screen program listings grid in response to a suitable user command. Another action may cause the grid to scroll, page, change its display (e.g., display listings by theme instead of channel, display listings in a list instead of in a grid), start a program search or action list, or perform any other suitable action in response to a suitable user command. The user selection of a program listing in the grid may, for example, cause the program guide to display a program listings information screen, start a recording, set a reminder, or perform other suitable actions.

When markup language documents are supplied to the interactive television program guide, the program guide interprets the documents and generates or modifies the appropriate program guide display screens and program guide functionality according to the documents without intervention by the user. The display characteristics of the display screens may be changed without the need for updating application code, and may be completed in real time and without ever involving the user in the update process.

Figure 6A:
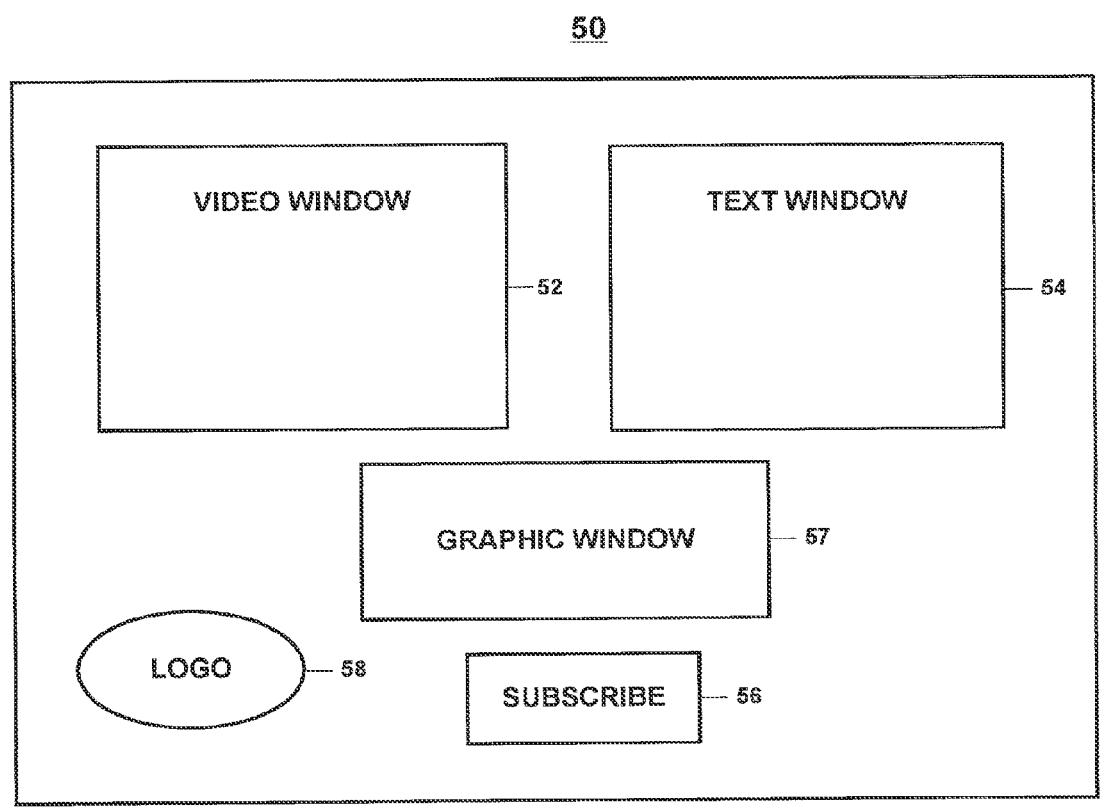
FIGS. 6a and 6b are illustrative display screens in accordance with the principles of the present invention.

FIG. 6a illustrates how a display screen, screen 50, may look after the program guide has been programmed with a markup language document, has interpreted it, and has generated the display screen and selected program guide functionality. Screen 50 may contain a number of display elements. For example, screen 50 may contain video window 52 and text window 54 for displaying promotional videos and information regarding the program being promoted (e.g., subscription price), respectively. Screen 50 may also have graphic window 57 for displaying a program listings grid (FIG. 4), such as program listings grid 150, or a program listings list, such as program listings list 170 (FIG. 5), or other graphic.

Screen 50 may also contain other display elements, such as on-screen options, or "buttons", which allow the user to access some feature of the program guide. For example, the user may "press" subscribe button 56 by entering appropriate commands on user interface 46 (FIG. 3). By pressing subscribe button 56 the program guide may allow the user to subscribe to the program being promoted. Screen 50 may also include a picture of the local service provider's logo, such as logo area 58.

The layout of screen 50 may become undesirable over time. For example, it may be decided that having a bigger video area and a smaller text area would be more attractive to the user. It may also be desirable to add additional features to the display screen, such as providing a "next" and "previous" button to allow users to scroll through promotional videos at their own pace. It may also be desirable to update the logo of the service provider.

Figure 6B:
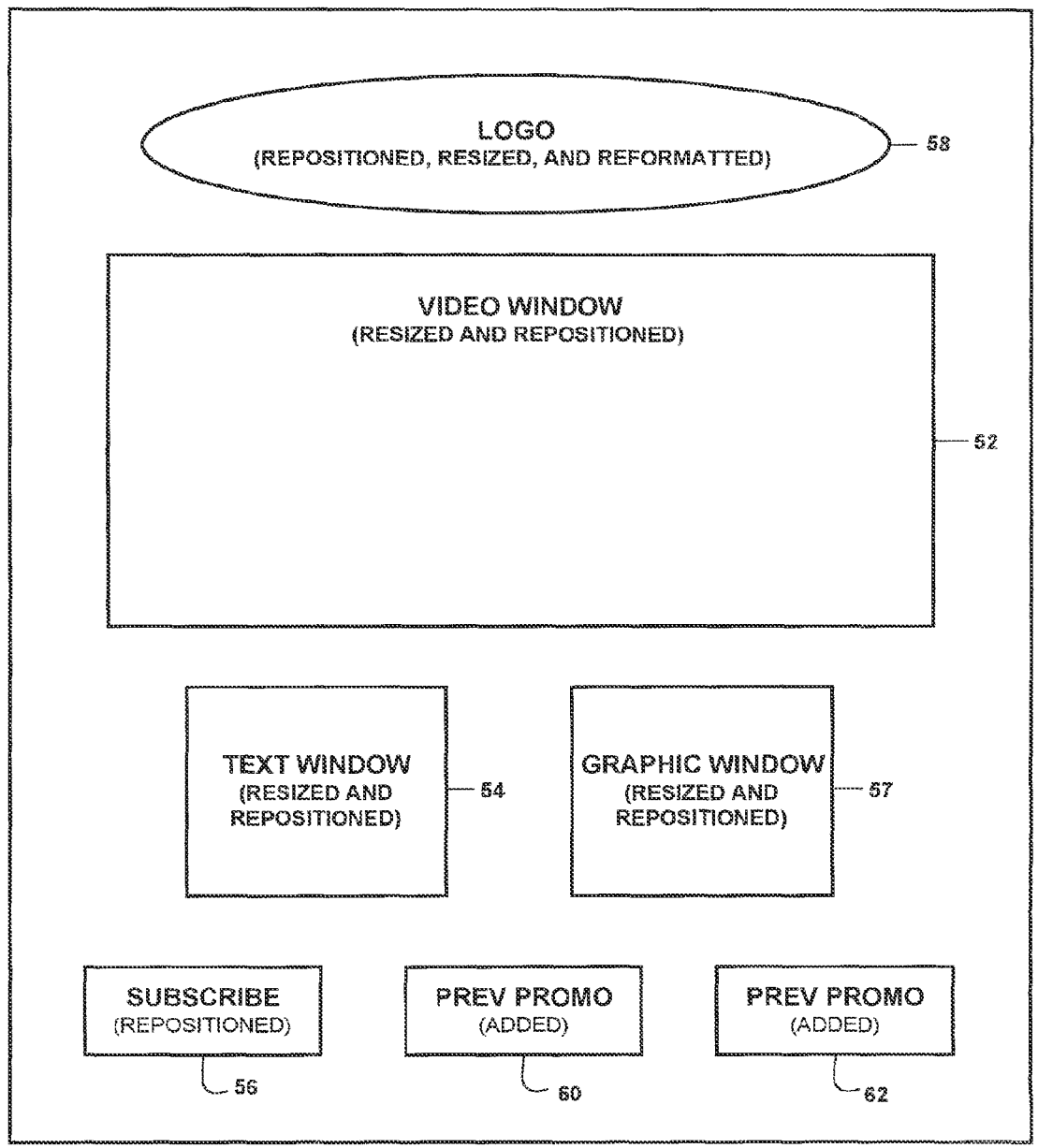

FIG. 6b illustrates how the display screen characteristics of screen 50 may be changed after the program guide has been supplied with a new markup language document from main facility 12 or television distribution facility 16 (FIG. 1) and has interpreted the document and regenerated screen 50. After screen 50 is regenerated by the program guide, video window 52, text window 54, and graphic window 57 may have been resized and repositioned accordingly. In addition if graphic window 57 contains a program listings grid, for example, the number of rows or columns of the grid may be changed, the start time of the grid adjusted, or any other suitable change to the grid made. Logo area 58 may have been resized and repositioned. Logo area 58 may also have been reformatted or styled by, for example, changing the style of text used, changing the colors of the logo, or by adding any other type of special effect. Next button 60 and previous button 62 may have been added.

Figure 7A:
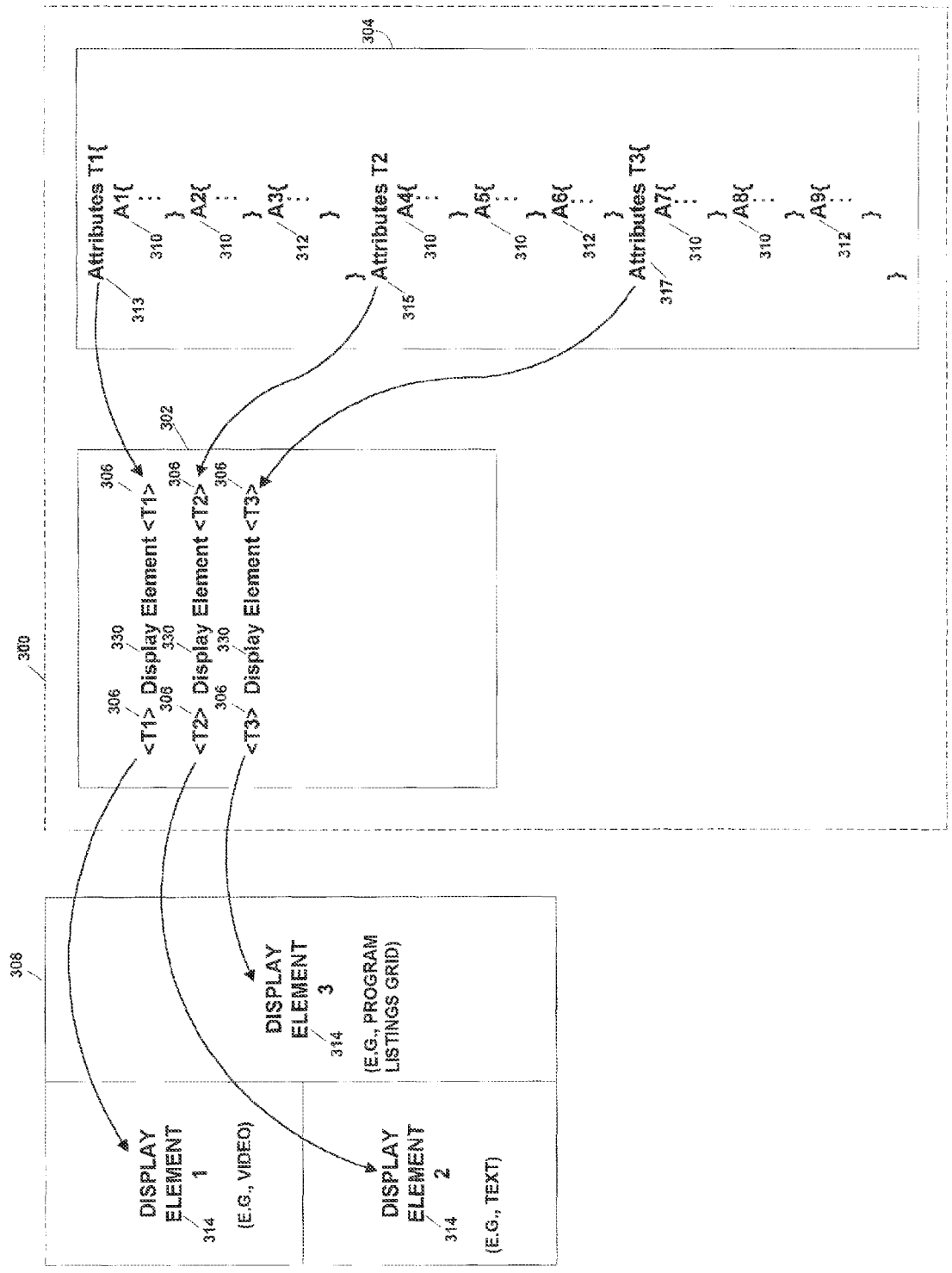
FIGS. 7a-7b illustrate how different markup language documents may be used to arrange and style display elements and indicate and select program guide functionality.

FIG. 7a illustrates how markup language documents may be used initially to arrange and style display elements and to indicate and select program guide functionality using a markup language document that is initially supplied to the program guide. Any suitable markup language or approach may be used. In practice, the markup language documents may be continuous, from top to bottom and the attributes of display items may immediately follow below a display item tag. Markup language document 300 has been illustrated, however, having left and right portions 302 and 304 to more clearly illustrate the principles of the present, invention. Portion 302 of markup language document 300 illustrates how display element identifier 300 may be tagged by tags 306. Portion 304 of markup language Document 300 illustrates how display element attributes may be organized into sets using markup language documents and assigned using the tags.

As shown in FIG. 7a, display element attributes 310 and 312 may be organized into sets 313, 315, and 317. Each display element may be assigned a set of attributes. Markup language document 300 may tag display element identifiers 330 using tags 306. Tags 306 are generically labeled T1, T2, and T3 to indicate which display element is being tagged (display element 1, display element 2, and display element 3, respectively). Tags 306 have associated attributes 310 (e.g., A1, A2, A4, A5, A7, and A8) from the sets that may indicate, for example, where on the display screen the display elements will be placed, their size, and how they will be styled (e.g., color, font special effects, etc.). To generate a display screen such as screen 308, the interactive program guide may parse the markup language document, extract the style and layout information, and generate a display screen accordingly.

FIG. 7a also illustrates how program guide functionality may be indicated and selected using markup language document 300. The program guide may have been preprogrammed with a large number of actions. Portion 304 of markup language document 300 may be used to select from those actions the actions that are suitable for a particular display element. Attributes 312 may be included in the finite sets of attributes 313, 315, and 317 to indicate the selected actions. While a display item may have multiple associated actions (e.g., a menu), only one attribute 312 has been shown for each set to avoid overcomplicating the drawing. The actions may be assigned to display elements 314 as indicated in FIG. 7a using tags 306.

Figure 7B:
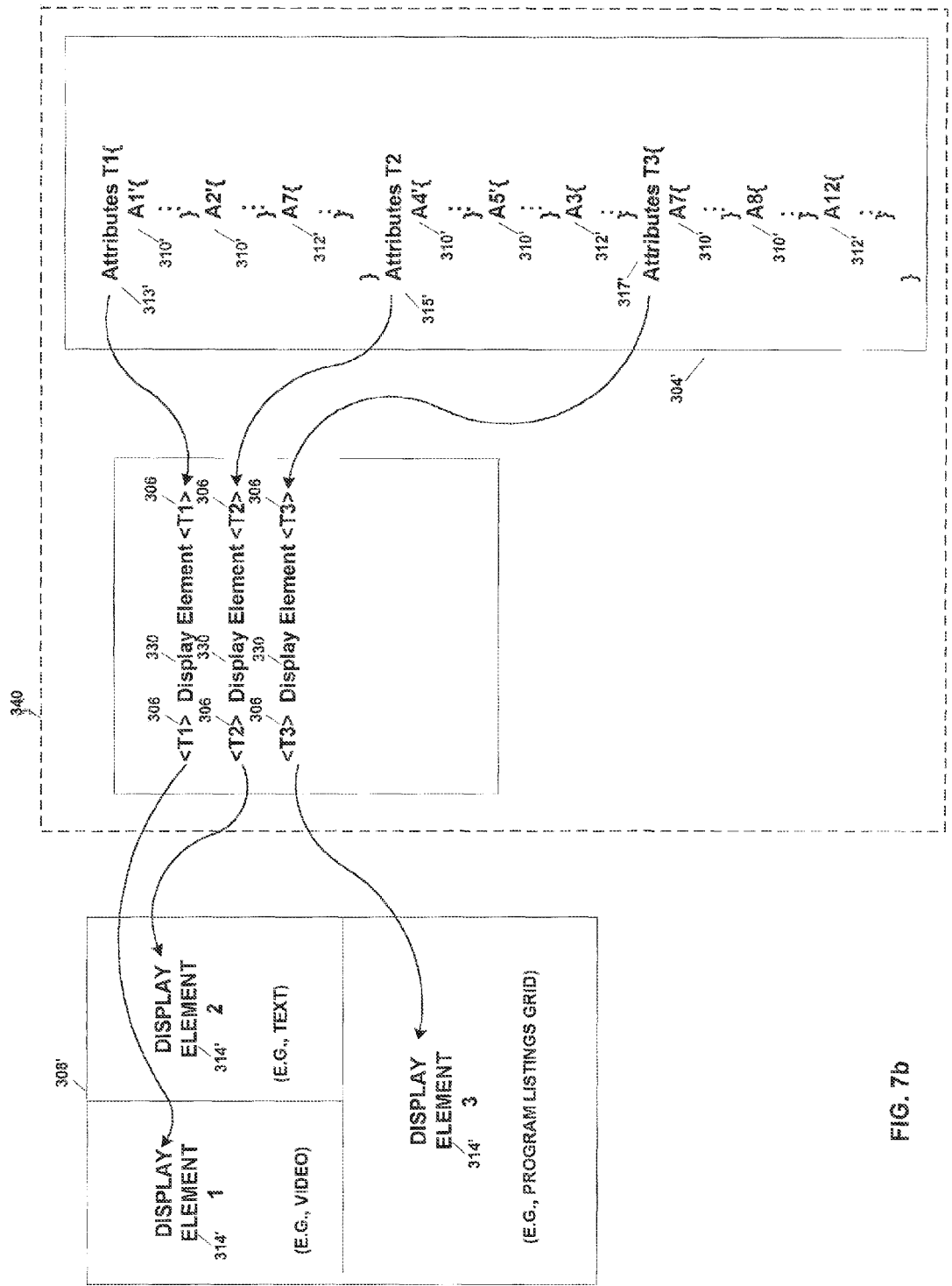

FIG. 7b illustrates how the display characteristics of display screen 308 may be changed or modified by rearranging and restyling display elements 314 using a different markup language document, such as markup language document 340. As shown, markup language document 340 may use tags 306 to assign sets of attributes to the display items. When the interactive program guide interprets and parses markup language document 340, it obtains the new or changed attributes 310' from the sets and uses tags 306 to generate, for example, display screen 308' with display elements 314'. As illustrated when display screen 308' is compared with display screen 308 of FIG. 7a, display elements 314 may be resized, repositioned, and restyled (not shown). Thus, a first markup language document (300) may be used by the interactive program guide to generate a first display screen 308, and a second markup language document (340) may be used to modify the display screen (308') (e.g., reposition, resize, and restyle display elements 314), thereby generating a second display screen with display characteristics different from the first.

FIG. 7b also illustrates how different actions for the display elements may be assigned and selected using markup language documents. Different actions may be included in the sets as illustrated when comparing sets 313, 315, and 317 of FIG. 7a with sets 313', 315', and 317' of FIG. 7c. New actions may be indicated and previously indicated actions dropped, as illustrated by set 317' and 315', (e.g., A12 and A6). In addition, the actions may be selected for different display elements as shown in set 313' (e.g., A7 was moved from set 317 of FIG. 7a to set 313' of FIG. 7b).

Figure 8:
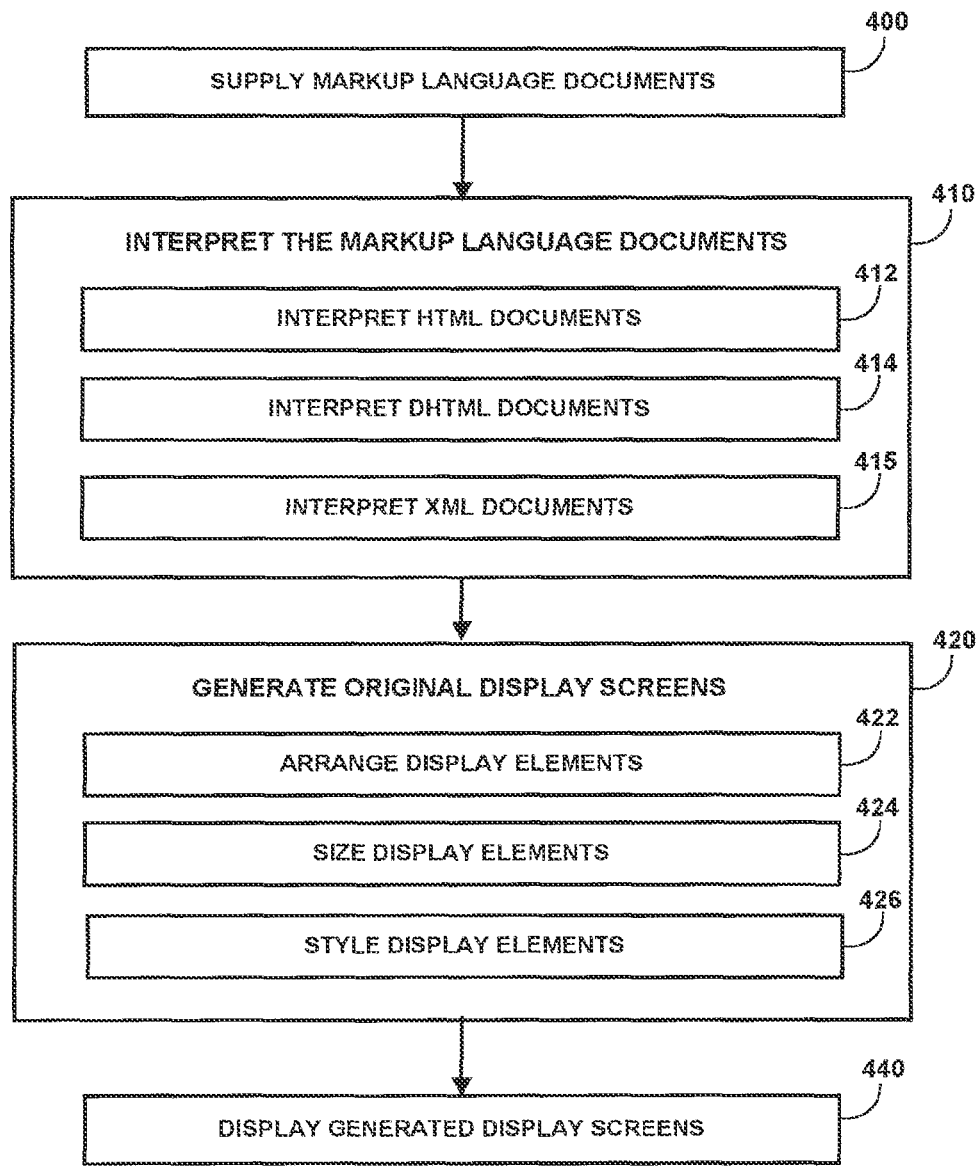
FIGS. 8-10 are flow charts of steps involved in the operation of the present invention.
Figure 9:
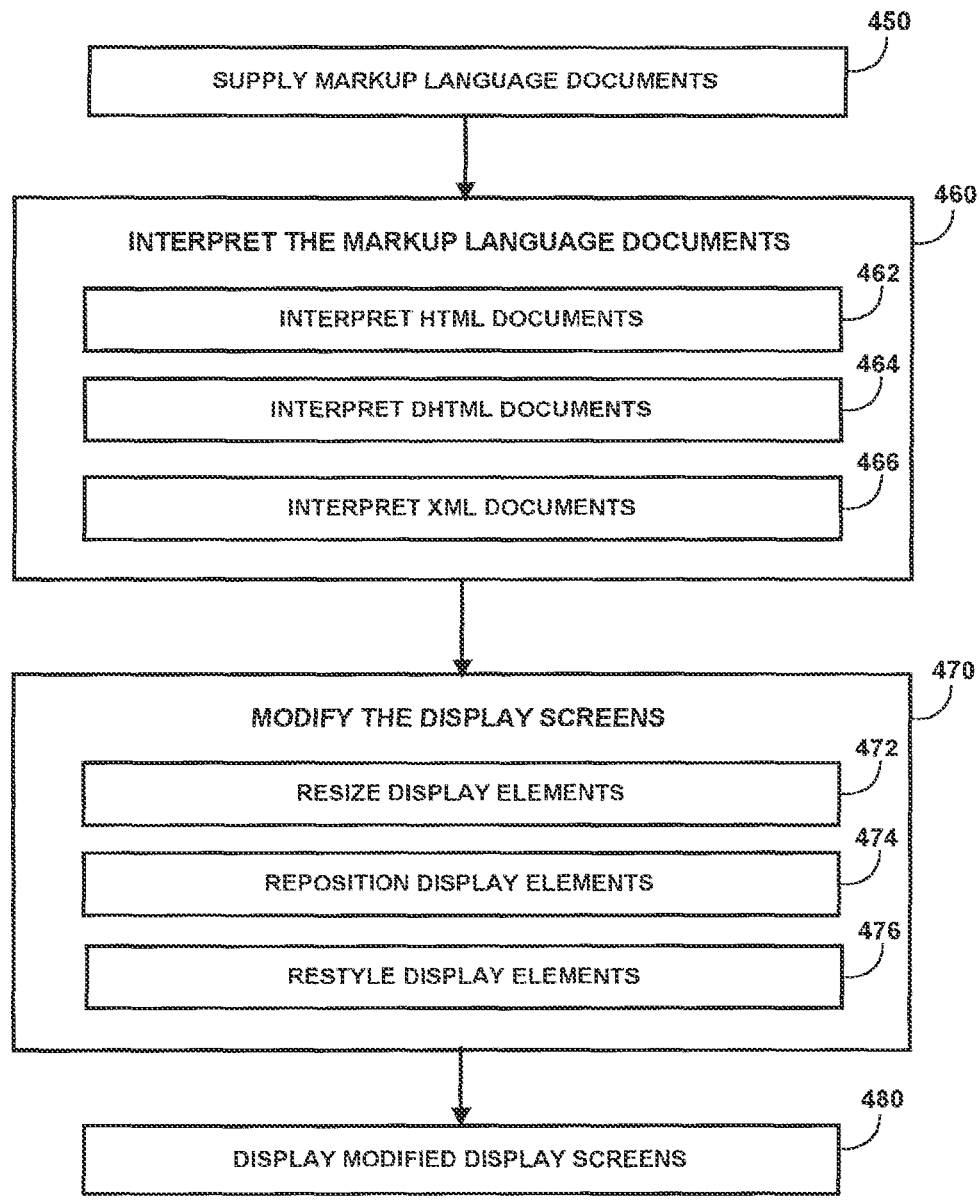
Figure 10:
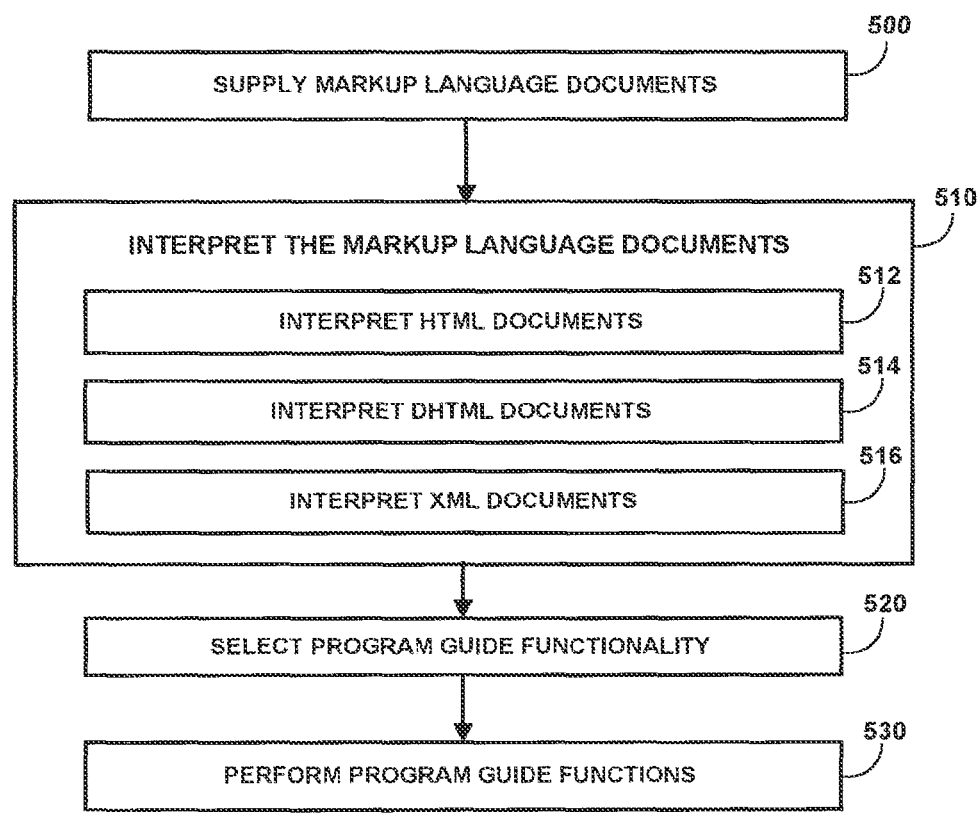

Steps involved in operating the program guide of the present invention are set forth in FIGS. 8-10. FIG. 8 illustrates steps involved in generating display screens. At step 400, the program guide is supplied with markup language documents which arrange and style the display elements as part of the initial programming of the program guide. The documents are preferably of a widely accepted and standardized markup language, such as HTML, DHTML, XML, or any other suitable markup language. At step 410, the program guide interprets the markup language documents. Particular types of markup language documents may be interpreted at substeps 412, 414 and 415, respectively. The display screens are generated according to the markup language documents at step 420. This may include substeps 422, 424, and 426, in which the display elements are arranged, sized, and styled, respectively. At step 440, the program guide displays the display screens according to the markup language documents.

FIG. 9 illustrates steps involved in modifying program guide display screens. At step 450, the program guide is supplied with markup language documents which may resize, reposition, or restyle the display elements. The documents are preferably of a widely accepted and standardized markup language, such as HTML, DHTML, XML, or any other suitable markup language. At step 460, the program guide interprets the markup language documents. Particular types of markup language documents may be interpreted at substeps 462, 464, and 466 respectively. The display screens are modified at step 470. This may include substeps 472, 474, and 476, in which the display elements are resized, repositioned, and restyled respectively. At step 480, the program guide displays the display screens according to the markup language documents.

FIG. 10 illustrates steps involved in assigning and selecting program guide functionality. The program guide functionality indicated, and selected may be apparent or hidden to the user. At step 500, the program guide is supplied with markup language documents which assign program guide functionality to display items. The documents may be supplied as part of the initial programming of the program guide, or may be supplied by a main facility or television distribution facility when the program guide is updated. The documents are preferably of a widely accepted and standardized markup language, such as HTML, DHTML, or XML. At step 510, the program guide interprets the markup language documents. As shown, HTML, DHTML, or XML markup language documents may be interpreted at substeps 512, 514, and 516, respectively. Program guide functionality is selected for the display items at step 520 according to the markup language documents. At step 540, the program guide performs the selected functions.

The foregoing is merely illustrative of the principles of this invention and various modifications can be made by those skilled in the art without departing from the scope and spirit of the invention.

What is claimed is:
1. A method comprising:
   generating for display, with a set-top box, a display item having a first program function, wherein the first program function is based on a non-markup language, and the first program function is preprogrammed on the set-top box;
   receiving, with the set-top box, a markup language document, from a remote source;

interpreting the markup language document, with the set-top box, to determine that the markup language document assigns a second program function to the display item;

updating the set-top box based on the markup language document such that the display item has the second program function; and generating for display, with the set-top box, the display item having the second program function.

2. The method of claim 1, wherein the updating the set-top box is in response to a user input.

3. The method of claim 1, wherein the second program function causes a display of the display item to change in response to a user input.

4. The method of claim 1, wherein updating the set-top box based on the markup language document such that the display item has the second program function comprises updating a displayed plurality of program listings from being displayed on a first portion of the display screen having a first size to the plurality of program listings being displayed on a second portion of the screen having a second size, where the second size is larger than the first size.

5. The method of claim 1, wherein updating the set-top box based on the markup language document such that the display item has the second program function comprises updating a displayed plurality of program listings from being displayed in an arrangement by channel to the plurality of program listings being displayed in an arrangement by theme.

6. The method of claim 1, wherein updating the set-top box based on the markup language document such that the display item has the second program function comprises updating a displayed plurality of program listings from being displayed as a grid to the plurality of program listings being displayed as a list.

7. The method of claim 1, wherein the second program function causes, in response to a user input, the updated set-top box to generate for display a program listing information screen, start a recording, set a favorite channel, or set a reminder.

8. The method of claim 1, wherein the markup language document is a Hyper Text Markup Language document, a Dynamic Hyper Text Markup Language document, or an Extensible Markup Language document.

9. A system comprising a set-top box with control circuitry configured to:

generate for display a display item having a first program function, wherein the first program function is based on a non-markup language, and the first program function is preprogrammed on the set-top box;

receive a markup language document from a remote source;

interpret the markup language document to determine that the markup language document assigns a second program function to the display item;

update the set-top box based on the markup language document such that the display item has the second program function; and generate for display, the display item having the second program function.

10. The system of claim 9, wherein updating the set-top box is in response to a user input.

11. The system of claim 9, wherein the second program function causes a display of the display item to change in response to a user input.

12. The system of claim 9, wherein updating the set-top box comprises updating a displayed plurality of program listings being displayed on a first portion of the screen having a first size to the plurality of program listings being displayed on a second portion of the screen having a second size, where the second size is larger than the first size.

13. The system of claim 9, wherein updating the set-top box comprises updating a displayed plurality of program listings being displayed in an arrangement by channel to the plurality of program listings being displayed in an arrangement by theme.

14. The system of claim 9, wherein updating the set-top box comprises updating a displayed plurality of program listings being displayed as a grid to the plurality of program listings being displayed as a list.

15. The system of claim 9, wherein the second program function causes, in response to a user input, the updated set-top box to generate for display a program listing information screen, start a recording, set a favorite channel, or set a reminder.

16. The system defined in claim 9, wherein the markup language document is a Hyper Text Markup Language document, a Dynamic Hyper Text Markup Language document, or an Extensible Markup Language document.

\* \* \* \* \*